US009609539B2

(12) United States Patent
Edge et al.

(10) Patent No.: US 9,609,539 B2
(45) Date of Patent: Mar. 28, 2017

(54) TECHNIQUES AND METHODS FOR CONTROLLING CROWDSOURCING FROM A MOBILE DEVICE

(71) Applicant: QUALCOMM Incorporated, San Diego, CA (US)

(72) Inventors: Stephen William Edge, Escondido, CA (US); David Richard Coleman, San Jose, CA (US); Kin Fai Wong, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 14/535,278

(22) Filed: Nov. 6, 2014

(65) Prior Publication Data

US 2015/0133152 A1 May 14, 2015

Related U.S. Application Data

(60) Provisional application No. 61/902,130, filed on Nov. 8, 2013, provisional application No. 61/902,780, filed on
(Continued)

(51) Int. Cl.
*H04W 24/10* (2009.01)
*H04W 64/00* (2009.01)
(Continued)

(52) U.S. Cl.
CPC ........... *H04W 24/10* (2013.01); *G01S 5/0236* (2013.01); *G01S 5/0242* (2013.01); *H04L 69/24* (2013.01);
(Continued)

(58) Field of Classification Search
CPC ....... H04W 64/00; H04W 4/02; H04W 24/10; H04W 4/027; H04W 4/025; G01S 5/0252; G01S 5/14
See application file for complete search history.

(56) References Cited

U.S. PATENT DOCUMENTS

| 2012/0021762 A1* | 1/2012 | Garin | G01C 21/206 455/456.1 |
| 2012/0028654 A1* | 2/2012 | Gupta | H04W 4/04 455/456.3 |
| 2012/0102164 A1* | 4/2012 | Gruen | H04W 4/02 709/222 |
| 2014/0067938 A1* | 3/2014 | Boldyrev | G01S 5/0252 709/204 |

FOREIGN PATENT DOCUMENTS

EP 2615801 A1 7/2013

OTHER PUBLICATIONS

LTE : "Evolved Universal Terrestrial Radio Access (E-UTRA); LTE Positioning Protocol (LPP) (3GPP TS 36.355 version 11.4.0 Release 11)," Technical Specification, European Telecommunications Standards Institute (ETSI), 650, Route Des Lucioles ; F-06921 Sophia-Antipolis ; France, vol. 3GPP RAN 2, No. V11.4.0, Sep. 1, 2013 (Sep. 1, 2013), XP014157713.
(Continued)

*Primary Examiner* — Liton Miah
(74) *Attorney, Agent, or Firm* — Silicon Valley Patent Group LLP

(57) ABSTRACT

Systems, apparatus and methods for crowdsourcing measurements of wireless base stations, access points and/or other transmitters from a mobile device to a server are presented. A crowdsourcing request sent by a server to a mobile device may comprise control parameters and measurement parameters. Control parameters may determine when a mobile obtains and reports measurements and measurement parameters may determine which types of measurements a mobile device obtains. Control parameters may comprise trigger parameters for crowdsourcing activation, measurement, reporting and duration. Crowdsourcing may be instigated by a control server and reported to a different data server. Crowdsourcing may be anonymous and may comprise basic or advanced reporting.

61 Claims, 15 Drawing Sheets

Related U.S. Application Data on Nov. 11, 2013, provisional application No. 61/903,039, filed on Nov. 12, 2013, provisional application No. 61/926,186, filed on Jan. 10, 2014, provisional application No. 61/926,887, filed on Jan. 13, 2014, provisional application No. 61/926,955, filed on Jan. 14, 2014, provisional application No. 62/029,997, filed on Jul. 28, 2014.

(51) Int. Cl.
*G01S 5/02* (2010.01)
*H04L 29/06* (2006.01)
*H04W 4/02* (2009.01)
*H04W 4/20* (2009.01)

(52) U.S. Cl.
CPC .............. *H04W 64/00* (2013.01); *H04W 4/02* (2013.01); *H04W 4/20* (2013.01)

(56) References Cited

OTHER PUBLICATIONS

International Search Report and Written Opinion—PCT/US2014/064609—ISA/EPO—Mar. 3, 2015.

Kapadia A et al., "AnonySense: Opportunistic and Privacy-Preserving Context Collection", May 19, 2008 (May 19, 2008), Pervasive Computing; [Lecture Notes in Computer Science], Springer Berlin Heidelberg, Berlin, Heidelberg, pp. 280-297, XP019110790, ISBN: 978-3-540-79575-9.

Orange et al., "MDT Measurement Model R2-100239", 3GPP TSG RAN WG2 Meeting #68BIS Valencia, Spain, vol. R2-100239, No. #68BIS, Jan. 18, 2010 (Jan. 18, 2010), pp. 1-3, XP002629990.

\* cited by examiner

TECHNIQUES AND METHODS FOR CONTROLLING CROWDSOURCING FROM A MOBILE DEVICE

CROSS-REFERENCE TO RELATED APPLICATIONS

This application claims the benefit of and priority under 35 U.S.C. §119(e) to U.S. Provisional Application No. 61/902,130, filed Nov. 8, 2013, titled "Crowdsourcing in a mobile device", U.S. Provisional Application No. 61/902,780, filed Nov. 11, 2013, titled "Crowdsourcing in a mobile device", U.S. Provisional Application No. 61/903,039, filed Nov. 12, 2013, titled "Crowdsourcing in a mobile device", U.S. Provisional Application No. 61/926,186, filed Jan. 10, 2014, titled "Crowdsourcing in a mobile device", U.S. Provisional Application No. 61/926,887, filed Jan. 13, 2014, titled "Crowdsourcing in a mobile device", U.S. Provisional Application No. 61/926,955, filed Jan. 14, 2014, titled "Crowdsourcing in a mobile device", U.S. Provisional Application No. 62/029,997, filed Jul. 28, 2014, titled "Crowdsourcing in a mobile device", each of which is assigned to the assignee hereof and incorporated herein by reference.

TECHNICAL FIELD

This disclosure relates generally to systems, apparatus and methods for crowdsourcing, and more particularly to controlling crowdsourcing of measurement data from a mobile device based on control parameters and measurement parameters.

BACKGROUND

Mobile devices today often use third Generation (3G) or the next generation Long Term Evolution (LTE) standards for wireless networks to support wireless communication and associated voice and data services. The ability to accurately locate mobile devices can be an important adjunct to such voice and data services. For example, a mobile device that places an emergency call may need to be accurately located to enable public safety dispatch to the location of the caller and a user of a mobile device may at times need to receive navigation instructions, directions or a map of their current location. Solutions to support accurate location of mobile devices have been developed and standardized by organizations such as the Third Generation Partnership Project (3GPP), the Third Generation Partnership Project 2 (3GPP2) and the Open Mobile Alliance (OMA), to name just three examples. For location solutions based on 3GPP and OMA standards, a number of positioning protocols have been standardized that control procedures used to position a mobile device when positioning is assisted or managed by a location server. Two prominent positioning protocols comprise the LTE Positioning Protocol (LPP) which is standardized by 3GPP and the LPP Extensions (LPPe) protocol which is standardized by OMA. The LPP protocol may be used by itself or the LPP protocol may be combined with the LPPe protocol to provide greater positioning capability. When LPP and LPPe are used in combination, the combined protocol may be referred to as LPP/LPPe.

In order to make use of such positioning protocols as LPP and LPPe to position mobile devices in an indoor environment and sometimes in an outdoor environment, a location server typically needs information on terrestrial wireless transmitters nearby to any mobile device being positioned, whose signals the mobile device can measure and/or which can measure signals from the mobile device, in order to determine the location of the mobile device. Terrestrial transmitters may include: (i) access points (APs) supporting WiFi transmission as defined by IEEE 802.11 protocols, Bluetooth® or Near Field Communication (NFC); (ii) cellular base stations (BSs) which may support LTE or some other 3GPP or 3GPP2 3G technology; and (iii) Femtocells or Home Base Stations supporting small cells and cells in home and office environments. The information that is needed by a location server for such terrestrial transmitters can comprise the location and the transmission characteristics (e.g. signal power and timing) of each AP, BS and Femtocell. Some or all of the information related to terrestrial transmitters may be obtained by a location server by receiving crowdsourcing measurements of terrestrial transmitter sent by a large number of mobile devices. Although the concept and use of crowdsourcing is now well established, the support of crowdsourcing in an efficient and flexible manner (e.g. using the LPP/LPPe positioning protocol) has not yet been resolved. For example, it may be beneficial to control the rate at which measurement data is crowdsourced by mobile devices to avoid overloading a server and using up unnecessary signaling resources including battery consumption at mobile devices. It may also be beneficial to control which types of measurement data are crowdsourced and for which APs, BSs and/or Femtos in order to avoid providing measurement data to a server that the server does not need or already has and to provide measurement data for APs, BSs and/or Femtocells that a server does need and may not already have. It may be further beneficial to allow mobile devices to negotiate with a server the extent to which crowdsourcing will be supported to save on mobile device and network resources, battery consumption and possibly costs to the user of conveying measurement data over a wireless network. There is thus a need for techniques and methods that enable control of crowdsourcing by both location servers and mobile devices.

SUMMARY

Disclosed are systems, apparatus and methods for crowdsourcing. According to some aspects, disclosed are systems, apparatus and methods as described and claims below.

According to some aspects, disclosed is a method in a mobile device for reporting crowdsourcing measurements to a first server, comprising: receiving a request from a second server, wherein the request comprises first control parameters and first measurement parameters; returning a response to the second server, wherein the response comprises second control parameters and second measurement parameters; obtaining measurements at a first plurality of different times, wherein the measurements are based on the second measurement parameters, and wherein the first plurality of different times is based on the second control parameters; and sending the measurements to the first server in a plurality of measurement reports at a second plurality of different times, wherein the second plurality of different times is based on the second control parameters.

According to some aspects, disclosed is a method in a server for obtaining crowdsourcing measurements from a mobile device, comprising: sending a request to the mobile device, wherein the request comprises first control parameters and first measurement parameters; receiving a response from the mobile device, wherein the response comprises second control parameters and second measurement parameters; and receiving measurements from the mobile device in a plurality of measurement reports, wherein the measurements are obtained by the mobile device at a first plurality of different times based on the second control parameters, and wherein the measurements are sent by the mobile device at a second plurality of different times determined by the second control parameters.

According to some aspects, disclosed is a mobile device for reporting crowdsourcing measurements to a first server, comprising: a receiver to receive a request from a second server, wherein the request comprises first control parameters and first measurement parameters; a transmitter to return a response to the second server, wherein the response comprises second control parameters and second measurement parameters; a processor to obtain measurements at a first plurality of different times, wherein the measurements are based on the second measurement parameters, and wherein the first plurality of different times is based on the second control parameters; and wherein the transmitter further sends the measurements to the first server in a plurality of measurement reports at a second plurality of different times, wherein the second plurality of different times is based on the second control parameters.

According to some aspects, disclosed is a server for obtaining crowdsourcing measurements from a mobile device, comprising: a transmitter to send a request to the mobile device, wherein the request comprises first control parameters and first measurement parameters; and a receiver: to receive a response from the mobile device, wherein the response comprises second control parameters and second measurement parameters; and to receive measurements from the mobile device in a plurality of measurement reports, wherein the measurements are obtained by the mobile device at a first plurality of different times based on the second control parameters, and wherein the measurements are sent by the mobile device at a second plurality of different times determined by the second control parameters.

According to some aspects, disclosed is a mobile device for reporting crowdsourcing measurements to a first server, comprising: means for receiving a request from a second server, wherein the request comprises first control parameters and first measurement parameters; means for returning a response to the second server, wherein the response comprises second control parameters and second measurement parameters; means for obtaining measurements at a first plurality of different times, wherein the measurements are based on the second measurement parameters, and wherein the first plurality of different times is based on the second control parameters; and means for sending the measurements to the first server in a plurality of measurement reports at a second plurality of different times, wherein the second plurality of different times is based on the second control parameters.

According to some aspects, disclosed is a server for obtaining crowdsourcing measurements from a mobile device, comprising: means for sending a request to the mobile device, wherein the request comprises first control parameters and first measurement parameters; means for receiving a response from the mobile device, wherein the response comprises second control parameters and second measurement parameters; and means for receiving measurements from the mobile device in a plurality of measurement reports, wherein the measurements are obtained by the mobile device at a first plurality of different times based on the second control parameters, and wherein the measurements are sent by the mobile device at a second plurality of different times determined by the second control parameters.

According to some aspects, disclosed is a non-transient computer-readable storage medium, for a mobile device to report crowdsourcing measurements to a first server, including program code stored thereon, comprising program code to: receive a request from a second server, wherein the request comprises first control parameters and first measurement parameters; return a response to the second server, wherein the response comprises second control parameters and second measurement parameters; obtain measurements at a first plurality of different times, wherein the measurements are based on the second measurement parameters, and wherein the first plurality of different times is based on the second control parameters; and send the measurements to the first server in a plurality of measurement reports at a second plurality of different times, wherein the second plurality of different times is based on the second control parameters.

According to some aspects, disclosed is a non-transient computer-readable storage medium, for a server to report crowdsourcing measurements from a mobile device, including program code stored thereon, comprising program code to: send a request to the mobile device, wherein the request comprises first control parameters and first measurement parameters; receive a response from the mobile device, wherein the response comprises second control parameters and second measurement parameters; and receive measurements from the mobile device in a plurality of measurement reports, wherein the measurements are obtained by the mobile device at a first plurality of different times based on the second control parameters, and wherein the measurements are sent by the mobile device at a second plurality of different times determined by the second control parameters.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
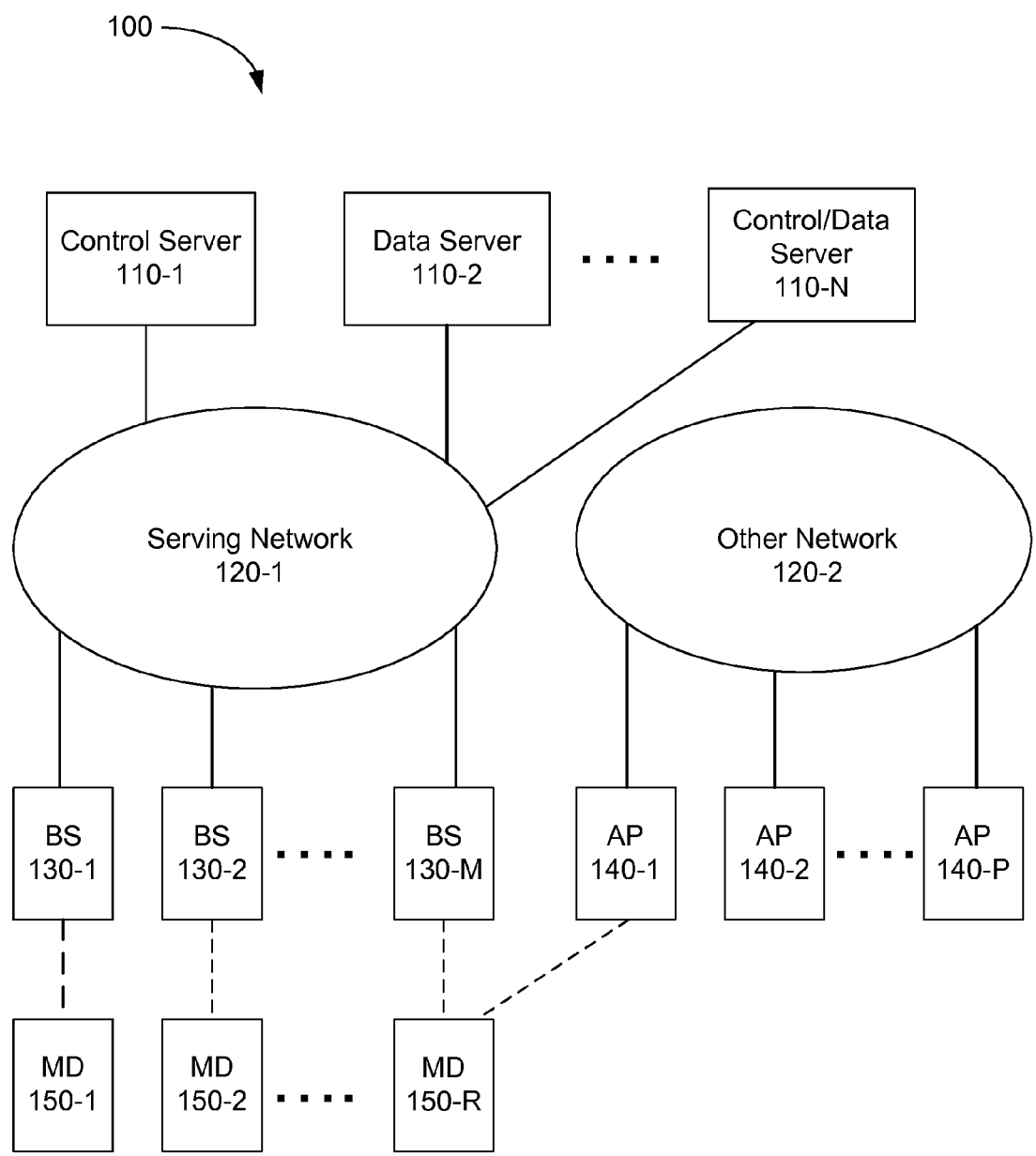
FIG. 1 shows an architecture diagram, in accordance with some example embodiments.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms, abbreviations and other descriptive terminology may be used merely for convenience and clarity and are not intended to limit the scope of the disclosure.

As used herein, the term "mobile device" refers to a device with wireless communication capability that can typically have a varying location and may be carried by a user. Examples of a mobile device include a cellular phone, a mobile phone, a smartphone, a tablet, a personal communication system (PCS) device, a personal navigation device (PND), a Personal Information Manager (PIM), a Personal Digital Assistant (PDA), a laptop or any other mobile device that is capable of receiving wireless communication and/or navigation signals and whose location can vary. A mobile device may sometimes be referred to as a device, a target, a target device, a mobile station (MS), a terminal, a mobile terminal, a Secure User Plane Location (SUPL) Enabled Terminal (SET), or a user equipment (UE). These terms may be used interchangeably herein. The term "mobile device" is also intended to include devices which communicate with a personal navigation device (PND), such as by short-range wireless, infrared, wireline connection, or other connection—regardless of whether satellite signal reception, assistance data reception, and/or position-related processing occur at the device or at the PND. Also, a "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

A location server may comprise a server that is part of a network such as a wireless network or can be accessed via a network such as a wireless network (e.g. is attached to a network or reachable from a network). Two examples of location servers are a Secure User Plane Location (SUPL) Location Platform (SLP) and an Enhanced Serving Mobile Location Center (E-SMLC). An SLP is a location server that supports the SUPL location solution defined by OMA, whereas an E-SMLC is a location server that supports the control plane location defined by 3GPP to locate mobile devices that are attached to an LTE wireless network. A location server can typically obtain the location of a mobile device or assist a mobile device to obtain its own location—for example by requesting location related measurements from the mobile device and then computing a location for the mobile device based on the received measurements. The measurements may be of signals transmitted from navigation satellite vehicles (SVs) such as SVs belonging to a Global Navigation Satellite System (GNSS) such as GPS, GLONASS or Galileo. The measurements may instead or in addition be of signals transmitted from nearby terrestrial transmitters such as APs, BSs and/or Femtocells. The measurements may be of signal timing such as signal time of arrival, signal time difference of arrival between different transmitters or signal round trip propagation delay (RTD). The measurements may also or instead be of signal strength (e.g. received signal strength indication (RSSI)) or signal quality (e.g. signal to noise ratio (S/N). A location server may also provide assistance data to a mobile device to assist a mobile device to acquire signals that are to be measured more quickly and/or measure the signals more accurately. In some embodiments, a location server may provide assistance to a mobile device to enable the mobile device to determine its own location from the signal measurements obtained by the mobile device.

A location server may use a positioning protocol such as LPP or LPP/LPPe to communicate with a mobile device, to convey instructions to the mobile device and/or to send and receive data to and from the mobile device in order to support positioning of the mobile device. For example, a positioning protocol may be used by a location server to obtain certain measurements or certain types of measurements (e.g. measurements associated with a particular GNSS or of transmitters in a particular wireless network) from a mobile device, to convey assistance data to a mobile device and/or to receive measurements and/or a location estimate of the mobile device from the mobile device. A mobile device may use a positioning protocol such as LPP or LPP/LPPe to send measurements or a location estimate to a location server and to request and receive assistance data from a location server. A location server may use a positioning protocol such as LPP or LPP/LPPe to request the capabilities of a mobile device to support positioning in terms of being able to support or not support different positioning functions (such as measurement of certain types of SV or terrestrial signals or support of certain types of assistance data) that are part of the positioning protocol. A mobile device may use a positioning protocol such as LPP/LPPe to request and obtain positioning capabilities of a location server that correspond to functions supported by the positioning protocol. An SLP and an E-SMLC may each support the LPP and LPP/LPPe positioning protocols, although the transport of LPP/LPPe protocol messages may be different. For example, with an SLP that supports the OMA SUPL solution, LPP/LPPe messages may be transported as data between the SLP and a mobile device (referred to as a SET in this context) using TCP/IP. With an E-SMLC supporting the 3GPP control plane solution for LTE access, LPP and LPP/LPPe messages may be transferred between the E-SMLC and a mobile device (referred to as UE in this context) using protocols and interfaces that form part of an LTE wireless network rather than as data using TCP/IP.

In order to be able to compute the location of a mobile device from measurements provided by the mobile device that comprise or include measurements of terrestrial transmitters, a location server may need certain data for each terrestrial transmitter for which measurements are provided such as its location (e.g. latitude, longitude and altitude), the wireless communication types that it supports (e.g. IEEE 802.11 type or types, LTE, Bluetooth etc.), antenna details (e.g. antenna gain, down tilt, horizontal radiation pattern) and its transmission characteristics for each supported wireless type (e.g. frequencies, bandwidth, transmission timing). A location server may need the same or similar data in order to transfer assistance data concerning terrestrial transmitters to a mobile device to assist the mobile device to acquire and measure signals from the terrestrial transmitters and/or determine its own location from such signal measurements.

The data concerning terrestrial transmitters may be gathered by the operator or provider of the location server and configured in the location server—e.g. using an Operations and Maintenance (O&M) capability. However, this may require an operator or provider to accurately locate each terrestrial transmitter (e.g. using surveying, GPS or an accurate map or building plan) as well as determine or verify its antenna details and transmission characteristics which may be time consuming, expensive and error prone and may have to be repeated periodically when transmitters are moved (e.g. if a small AP or Femtocell is moved inside a building) or reconfigured or upgraded (e.g. to support new frequencies or a different transmission power). In addition, for location servers that need to locate a mobile device that measures signals from terrestrial transmitters that do not belong to or are not otherwise associated with the provider or operator of the location server, it may not be possible to directly obtain much if any information on the wireless transmitters.

In order to obtain information concerning wireless transmitters that may use to help position mobile devices (e.g. may be sent as assistance data to mobile devices or used to compute the locations of mobile devices) more easily and less expensively, a number of mobile devices may be instructed by a location server to crowdsource information on terrestrial transmitters to the location server. The information that is crowdsourced for any terrestrial transmitter may include (i) its identity (e.g. a global media access control (MAC) address in the case of a WiFi or Bluetooth AP or a global cell identity in the case of a BS or Femtocell that supports at least one wireless cell such as an LTE cell), (ii), the location or locations of the mobile device at which measurements were obtained if the location or locations can be obtained by the mobile device without making user of the provided measurements, (iii) signal measurements of the transmitter (e.g. RSSI, RTD, time of arrival, time difference of arrival), (iv) data concerning the transmitter that may be sent openly (e.g. via broadcast) by the transmitter such as its location and transmission characteristics) and (v) information that may be inferred or calculated by the mobile device for the transmitter such as its location. The information that a location server receives from many mobile devices (e.g. hundreds or thousands of mobile devices) for each terrestrial transmitter may be combined by the location server in different ways. For example, information containing values for certain characteristics of the transmitter or that allow the location server to compute values for certain characteristics of the transmitter (e.g. its location, transmission power, transmission timing) may be averaged in different ways (e.g. using a weighted average where more reliable values and/or more recent values are weighted more highly). Information containing signal measurements (e.g. for RSSI or RTD) for a transmitter that were obtained at different known locations for mobile devices may be both averaged for common locations of mobile devices and combined into a grid of values, constituting a "heat map", that may provide values for the signaling characteristics at different locations such as locations spaced 1 meter apart from each other in a grid of locations (e.g. a rectangular grid of locations) covering part or all of the wireless coverage area of a transmitter. A heat map may be subsequently used by a locations server or sent to a mobile device to enable location of a mobile device from signal measurements by the mobile device of several or many different transmitters using a technique known as pattern matching. With pattern matching, actual signal measurements of several or many transmitters by a mobile device can be compared to the signal values in a heat map for each measured transmitter to determine a location where the actual signal measurements most closely match the values in the heat maps for the measured transmitters.

In order to instigate crowdsourcing of measurement related data, a location server may request measurements and other information from a number of mobile devices. The mobile devices may then respond with the requested measurements—e.g. may send the requested measurements at periodic intervals (e.g. every 15 or 30 minutes). The individual responses and the set of responses from the mobile devices may be referred to as crowd sourced measurements, crowdsourced data or crowdsourcing. Crowdsourcing may assist the location server at localization related tasks as previously described. For example, crowdsourcing may assist the location server at determining or verifying a location of a network AP or a BS. Crowdsourcing may assist the location server at determining probable locations of other mobile devices by providing information that can be later used by the location server to determine such locations from measurements provided by these other mobile devices and/or from measurements provided by network entities (e.g. including BSs, APs and Femtocells) that measure signals transmitted by these mobile devices. Crowdsourcing may also assist the location server at determining environmental parameters of a specific location, for example, if a location is indoors or outdoors.

Crowdsourcing data from a large number of mobile devices may overload a location server, overload one or more intermediate networks, consume significant resources in mobile devices, networks and/or a location server, consume mobile device battery power, interfere with mobile device operation and service to a mobile device user and incur wireless network usage charges for mobile device users, In addition, crowdsourcing data may be provided by mobile devices for networks, APs and BSs for which a location server does not need any data (e.g. cannot make use of or already has) and may not be provided for networks, BSs and APs for which a location server does need data. Thus, preferably, controlling crowdsourcing to maximize useful measurement reporting from mobile devices over a long time period is desired without imposing excessive battery drain and use of memory in a mobile device, without imposing excessive use of memory in a crowdsourcing server, and without significant use of signaling bandwidth (which in some cases may be charged to a user) between a mobile device and a crowdsourcing server. Techniques and solutions to enable such preferred control of crowdsourcing are described herein further on.

The terms "measurement data", "measurements", "measurement related data" and "crowdsourcing related information" are used interchangeably herein to refer to measurements and other information obtained by a mobile device that are of a type that may be subsequently sent to a server to support crowdsourcing.

It should be understood that while the present disclosure relates to controlling crowdsourcing of measurement related data for terrestrial transmitters such as BSs and APs by mobile devices, the same systems and techniques may be used to control crowdsourcing of other types of data by mobile devices that may not be related to terrestrial transmitters. Examples of such other types of data may include photographic, video and/or audio data related to different places and locations (e.g. locations and places in a city or inside a building) that may be gathered by mobile devices, data entered by users of mobile devices into the mobile devices (e.g. descriptions and identifications of places and locations) and data concerning the operation of mobile devices and networks (e.g. identifications of dropped calls and loss of network coverage).

FIG. 1 shows a system 100, in accordance with some example embodiments. The system 100 includes a number R (R≥1) of mobile devices (MDs) labelled 150-1, 150-2 up to 150-R, a number M (M≥0) of BSs labelled 130-1, 130-2 up to 130-M, a number P (P≥0) of APs and/or Femtocells (both referred to as APs in FIG. 1) labelled 140-1, 140-2 up to 140-P and a number N (N≥1) of servers labelled 110-1, 110-2 up to 110-N. Servers 110 may of three types: a control server, a data server and a control/data server as described further down herein. System 100 also includes a serving wireless network 120-1 for the MDs 150 and one other wireless network 120-2 that may not be a serving network for one or more of the MDs 150. The serving network 120-1 is shown as including the BSs 130 and either includes or provides access to the servers 110. The other network 120-2 is shown as including the APs 140. In system 100, MDs 150-1, 150-2 and 150-R are shown as being attached to and accessing serving wireless network 120-1 via BSs 130-1, 130-2 and 130-M, respectively, which are referred to a serving BSs for the MDs for which network access is provided. MD 150-R is also shown as being attached to and accessing other network 120-2 via AP 140-1. Although not shown in FIG. 1, system 100 may represent other network configurations. For example: (i) one or more of MDs 150 (besides MD 150-R) may access network 120-2 or some other network not shown in FIG. 1 instead of or in addition to network 120-1 and may access network 120-2 or some other network via one or more APs 140 which may then be referred to as serving APs for the MDs for which network access is provided; (ii) one or more of APs 140 may be part of serving network 120-1 or some other network not shown in FIG. 1 rather than network 120-2; (iii) one or more of BSs 130 may be part of network 120-2 or some other network not shown in FIG. 1 rather than 120-1; and (iv) one or more of servers 110 may be part of network 120-2 or some other network not shown in FIG. 1 rather than network 120-1 and/or may be accessed from network 120-2 or some other network not shown in FIG. 1 in addition to or instead of network 120-1.

Networks 120-1 and 120-2 in FIG. 1 may each correspond to any type of cellular network, wireless local area network (WLAN), wireline network or other wireless network. Examples of cellular networks include networks supporting LTE, Wideband Code Division Multiple Access (WCDMA) and Global System for Mobile Communications (GSM). Examples of WLAN include networks supporting IEEE 802.11 WiFi and Bluetooth. Examples of wireline networks include networks providing DSL and packet cable access, possibly via local WiFi APs. Examples of other wireless networks include IEEE 802.16 WiMAX. BSs 130 may support any wireless technology for cellular or other wireless networks (e.g. may support LTE, WCDMA, GSM or WiMAX). APs 140 may support any WLAN wireless technology (e.g. IEEE 802.11 WiFi or Bluetooth). Some or all of APs 140 may instead or in addition function as femtocells and support a cellular wireless technology such as LTE or WCDMA.

One or more of servers 110 may be a location server such as an SLP or an E-SLMC and support location of one or more of MDs 150. Each of servers 110 may in addition support crowdsourcing of measurement related data from one or more of MDs 150. In the case that a server 110 is an SLP, the server may be a Home SLP (H-SLP) for some set of MDs (e.g. including one or more of the MDs 150 in FIG. 1) and/or may be a Discovered SLP (D-SLP) or Emergency SLP (E-SLP) for other MDs including one or more of MDs 150 in FIG. 1.

In system 100, MDs 150 may be attached to a single network (e.g. network 120-1 in the illustration of FIG. 1) and/or may be attached to more than one network (e.g. attached to networks 120-1 and 120-2 in the case of MD 150-R in FIG. 1). Each of MDs 150 may receive signals from the BS or AP via which it accesses a network—e.g. MD 150-R may receive signals from BS 130-M via which it accesses network 120-1 and from AP 140-1 via which it accesses network 120-2. In addition, each of MDs 150 may be able to receive signals from one or more BSs and/or APs that are not used to access a network. For example, MD 150-1 may receive signals from BS 130-2 and/or from AP 140-1 in addition to receiving signals from BS 130-1. Each MD 150 may therefore be able to make measurements of and obtain information for both a serving BS and/or serving AP as well as additional BSs and/or APs that are not serving BSs or serving APs for the MD 150. For example, if MD 150-R is able to receive signals from a non-serving BS 130-1 and a non-serving AP 140-2, it may be able to make measurements of and obtain information for BS 130-1 and AP 140-2 in addition to making measurements of and obtaining information for its serving BS 130-M and serving AP 140-1.

As described previously herein, one or more of servers 110 may instigate crowdsourcing by one or more of MDs 150 and may receive crowdsourcing information periodically from these MDs. The crowdsourcing information may refer to BSs and/or APs that serve each MD and/or may refer to BSs and/or APs that do not serve each MD but whose signals can be received by each MD.

In one embodiment, three types of server may be distinguished: a control server such as server 110-1 in system 100, a data server such as server 110-2 in system 100 and a control/data server such as server 110-N in system 100. A control server 110 may control crowdsourcing from one or more MDs by starting and stopping crowdsourcing in each MD 150 and by controlling how crowdsourcing is performed. A data server 110 may be the recipient of crowdsourcing data and may not control how crowdsourcing is performed. A control/data server may support the functions of both a control server and a data server—e.g. may start crowdsourcing from one or more MDs, control how the crowdsourcing is performed and receive the crowdsourcing data. Unless explicitly stated otherwise, when sending control information, a server 110 or a control server 110-1 may be referred to as a control server, a control server 110 or a control/data server. When receiving crowdsourcing information, a server 110 or a data server 110-2 may be referred to as a data server, a server 110 or a control/data server.

When performing crowdsourcing if requested by a control capable server such as server 110-1 or server 110-N, an MD 150 in system 100 may record measurements from its serving BS 130 (if there is a serving BS 130), serving AP 140 (if there is a serving AP 140), one or more non-serving BSs 130 and/or one or more non-serving APs 140. In some embodiments, an MD 150 that is performing crowdsourcing may have more than one serving BS 130 and/or more than one serving AP 140, in which case measurements and other information may be collected and crowdsourced for these additional serving BSs and/or serving APs as well.

Crowdsourcing Principles

As previously described herein, crowdsourcing involves instigating and subsequently receiving measurements and other information at a server from one or more mobile devices (also referred to as targets or target devices) for one or more types of terrestrial transmitters. The transmitters for which crowdsourcing measurements and other information may be obtained and reported to a server by a mobile device may include WLAN APs such as WiFi APs, LTE eNode Bs, WCDMA Node Bs, GSM BSs, Code Division Multiple Access 2000 1x (cdma2000 1x) BSs, cdma2000 High Rate Packet Data (HRPD) base stations and short range nodes (SRNs) such as Bluetooth APs or NFC APs. In addition, measurements and information obtained from sensors on a mobile device may be included in crowdsourcing data and sent to a server—e.g. measurements of local barometric pressure, local temperature, local humidity, local sound level and local lighting level and information obtained by sensors showing the current motion state of the user of the mobile device such as being stationary, walking, running, being in a vehicle, on a train etc. LTE, WCDMA and GSM are radio technologies defined by 3GPP. Cdma2000 1x and cdma2000 HRPD are radio technologies defined by 3GPP2.

A server such as a data server 110 in system 100 to which crowdsourcing measurements and other information may be provided by mobile devices or a server to which this information is later forwarded (possibly after being combined) by a data server 110 may use the measurements and other information to determine or help determine location related information (e.g. estimated locations and/or transmission characteristics) for terrestrial transmitters (e.g. base stations 130 and APs 140) which may be used at the server or by another server to support positioning of mobile devices and/or support sending of assistance data to mobile devices to help support positioning by these recipient mobile devices. In another example, the crowdsourcing measurements and other information may be used by a server for network optimization—e.g. to help plan deployment or redeployment of transmitters in a network and/or adjust transmission capabilities of existing transmitters such as base stations 130 and/or APs 140 in the network.

Crowdsourcing procedures as described for embodiments herein may enable a control server 110 to request a target 150 to send crowdsourcing measurements for a limited or unlimited period to a designated data server. The control server 110 instigating the crowdsourcing may differ from the data server to which crowdsourcing measurements and other crowdsourcing information are sent. The use of a separate data server may have the advantage of: (i) preventing or limiting the influx of crowdsourcing data at the control server; (ii) enabling load sharing of crowdsourcing data over a plurality of two or more data servers (e.g. with different sets of mobile devices crowdsourcing measurements and other information to different data servers in the plurality of data servers); and/or (iii) providing the measurement data to a server that is dedicated to the processing of crowdsourcing data (e.g. a server with the necessary programming software and hardware resources to process the data). The control server 110 may provide control parameters to a target 150 when crowdsourcing by the target 150 is first initiated by the control server 110. The control parameters may define the types of crowdsourcing measurements and other information that are to be obtained by the target 150, for which BSs and APs the measurements and other information are to be obtained, when the measurements and other information are to be obtained and when they are to be returned by the target 150 to the data server 110.

In an embodiment, a target 150 that receives control parameters from a control server 110 that is initiating crowdsourcing by the target 150 may return other control parameters to the control server 110. The returned control parameters may be defined and encoded in a similar or identical manner to the control parameters sent by the control server 110. The returned control parameters may indicate the types of crowdsourcing that the target 150 agrees to provide or is able to provide. For example, the control parameters returned by a target 150 to a control sever 110 may indicate the measurements and other information that the target 150 agrees to or is able to provide, for which BSs and/or APs the measurements and other information will be obtained by the target 150, when the measurements and other information will be obtained by the target 150 and/or when the measurements and other information will be returned by the target 150 to the data server.

In a further embodiment, control parameters may include trigger parameters that may be divided into four groups comprising: (1) activation trigger parameters; (2) measurement trigger parameters; (3) reporting trigger parameters; and (4) duration trigger parameters. Control parameters may comprise trigger parameters from any combination of these groups or none of the groups. Activation trigger parameters may define the trigger conditions for activating and deactivating crowdsourcing measurements and gathering of other information at a target 150 and may be sent by a control server 110 and/or returned by a target 150 to avoid a target 150 obtaining crowdsourcing measurements and other information in conditions when obtaining measurements and other information may be difficult or not needed. Use of activation trigger parameters by a control server 110 or target 150 may also enable target resources to be conserved (e.g. battery life, memory usage, signaling bandwidth) and/or may enable the crowdsourcing load (e.g. volume and throughput of crowdsourcing data) at a data server to be reduced and/or limited. When crowdsourcing is deactivated in a target 150 according to the activation trigger parameters, the target 150 may not obtain new crowdsourcing measurement data and other new information but may continue to report any previously obtained measurement data and other information to a data server according to the reporting trigger parameters.

Measurement trigger parameters may define when and how often crowdsourcing measurements and other information should be obtained by a target 150 when crowdsourcing measurements have been activated according to the activation trigger parameters. Similarly, reporting trigger parameters may define when and how often crowdsourcing measurement data and other information that have already been obtained according to the measurement trigger parameters should be returned by a target 150 to a data server 110, for example in a set of measurement reports. Reporting trigger parameters may include a reporting mode, which may comprise: (1) a real time mode indicating that measurement data and other information are to be sent by a target 150 to a data server 110 as soon as they are made or discarded if the measurement data and other information cannot be sent; (2) a quasi-real time mode indicating that measurement data and other information should be sent by a target 150 as soon as obtained as for real time mode but may be sent later (as for batch mode discussed next) if sending as for real rime mode is not possible; and (3) a batch mode where measurement data and other information obtained by a target 150 according to the measurement trigger parameters are to be sent generally sometime after being obtained and in batches. Additional control parameters may be provided for batch mode that define when a target 150 should send batches of already obtained crowdsourcing measurement data and other information to a data server 110. For example, these additional parameters may define a periodic interval for sending (e.g. every one hour) or a condition for sending such a target 150 moving to a new serving network or to a new location. In some embodiments of batch mode, all crowdsourcing measurement data and other information that have been obtained and stored by a target 150 up to a current time may be sent to a data server 110 when the additional parameters for batch mode indicate that crowdsourcing information should be sent to the data server. In other embodiments of batch mode, the amount of crowdsourcing data that is sent by a target 150 may be limited (e.g. to be less than 1 Mbyte or to comprise only data that was obtained more than one hour previously) in order to limit use of target 150 signaling resources and load on the data server 110. Once any measurement data and other information has been sent to a data server 110, a target 150 may discard the measurement data and other information (e.g. remove the measurement data and other information from target 150 storage).

Duration trigger parameters may be used to trigger the termination of crowdsourcing by a target 150 and may define for how long a target device should collect and provide crowdsourcing data and/or conditions for terminating crowdsourcing such as a low battery state or a target being powered off by a user. Duration trigger parameters may include a duration of crowdsourcing that may indicate a fixed duration (e.g. 24 hours) or may indicate an unlimited duration whereby a server 110 or target 150 may later decide when crowdsourcing will be terminated.

A target 150 may be enabled to confirm whether or not it will fulfill a crowdsourcing request from a control server 110 and may then return control parameters to the control server 110 indicating the types of measurements and other information that the target 150 agrees to or is able to provide along with trigger parameters of the types previously described herein that the target 150 agrees to or is able to support Control parameters returned by a target 150 to a control server 110 may be the same as those originally sent by the control server 110 if the target 150 agrees to or can support all of the crowdsourcing actions associated with these control parameters or may differ from the control parameters originally sent. In the latter case, a target 150 may employ a subset policy in which crowdsourcing measurements and other information that will be provided by the target 150 will be a subset of those requested by the control server 110. In addition in a subset policy, control parameters agreed to or able to be supported by the target 150 may either omit requested control parameters originally sent by the control server 110 or include requested control parameters that are set to values that will reduce the frequency and/or duration of crowdsourcing deactivation, the obtaining of measurement data and/or the reporting of measurement data by the target 150. In some cases when a reporting mode is used, a target does not change the mode requested by the server.

In some embodiments, a control server 110 and/or a data server 110 may query a target 150 to verify whether crowdsourcing is active in the target 150 and, if so, which measurement data and other information is being obtained by the target 150 and which control parameters are being used by the target. A target 150 that is queried in this manner by a control or data server 110 may indicate to the control or data server 110 whether the target 150 is currently performing crowdsourcing and whether the server 110 querying the target 150 is either the control server or data server for any crowdsourcing currently being performed by the target 150. The target 150 may also return control parameters that define how the crowdsourcing is being performed by the target (e.g. the control parameters defining the trigger parameters). Querying of a target 150 by a server 110 may enable detection by a server 110 of conditions where control parameters assumed by a target 150 are incorrect or no longer appropriate and/or conditions where crowdsourcing has stopped in a target 150 before a designated end time or end condition set by a duration trigger parameter (e.g. where a user may have aborted crowdsourcing or a target 150 may have been forced to stop crowdsourcing due to a low battery level or being powered off by a user). A query may also enable a control server or data server 110 to periodically poll targets 150 regarding crowdsourcing, e.g. when a control server or data server 110 does not maintain records of the crowdsourcing ongoing in targets 150. Targets 150 for which crowdsourcing is not currently active may then be requested by the server 110 to start crowdsourcing. In some embodiments, a control server or data server 110 may abort an ongoing crowdsourcing session in a particular target 150—e.g. because crowdsourcing measurement data is no longer needed or to reduce load on the data server. A server abort may be signaled to a target by the sending of an abort message. In some cases, a target 150 may abort an ongoing crowdsourcing session—e.g. due to user intervention or because a target has insufficient resources such as having a low battery level. In some cases a target abort of crowdsourcing previously instigated by a control server may not be signaled to either the control server or the data server for the crowdsourcing that is being aborted. In some cases, however, a target 150 may indicate the end of crowdsourcing to a control server or to a data server, for example, when reporting crowdsourcing measurements to the data server thereby stopping crowdsourcing in a controlled manner.

In some embodiments, crowdsourcing may be identified or may be anonymous. With identified crowdsourcing, crowdsourcing reports containing crowdsourcing measurement data and other information that are sent by a target 150 to a data server 110 may carry a unique session ID assigned by the control server that originally instigated the crowdsourcing. The session ID may be used by the data server 110 to identify the target 150. The identification may be unique and may then identify the particular target 150 (e.g. by association of the session ID with a global public identification of the target 150 such as an International Mobile Subscriber Identity (IMSI)) or the identification may be relative and just identify the target 150 in terms of being able to associate different crowdsourcing reports sent by the target 150 to the data server 110 at different times as being sent by the same target 150. With anonymous crowdsourcing, a reserved session ID (e.g. a value of zero) may be included by a target 150 in crowdsourcing reports to prevent a data server 110 from identifying the target 150 either uniquely or relatively as described earlier herein. Anonymous crowdsourcing may be defined by a control server when requesting crowdsourcing or indicating by a target 150 when confirming a request for crowdsourcing in order to protect the identity of the target 150. For example, use of anonymous crowdsourcing may prevent a data server 110 from tracking the location of a target 150 and may thereby ensure user privacy. A target may have the ability to set the session ID to zero, for example, to indicate that crowdsourcing will be anonymous when confirming crowdsourcing to the control server even if the control server had assigned a unique session ID.

In some embodiments, only one ongoing crowdsourcing session may be allowed for or supported by a target 150 with respect to a particular server 110 regardless of whether the server 110 acts as a control server or data server with respect to the target 150. This restriction of a single ongoing session may simplify crowdsourcing and reduce the possibility of loss of synchronization between a server and a target with respect to ongoing crowdsourcing. When a restriction to a single ongoing session is in effect for a particular target 150 and if a control server 110 that is already acting as a control server or a data server for an ongoing crowdsourcing session with the target 150 requests a new crowdsourcing session from the target 150, the target 150 may abort the ongoing session and then process the request for the new session. In some cases when the new session is rejected, the previous session may still be aborted. This procedure may help with overcoming a loss of synchronization between a server and a target. When a restriction to a single ongoing session is in effect for a particular target 150 and if a control server 110 that is neither the control server nor data server for an ongoing crowdsourcing session with the target 150 requests a new crowdsourcing session from the target 150 and specifies a data server for which there is an ongoing crowdsourcing session with the target 150, the target 150 may reject the request. This restriction may prevent a new server from interfering with crowdsourcing invoked by another server. Even with a restriction to a single ongoing session with respect to any server, a target may still support multiple crowdsourcing sessions using different control and data servers for each session.

To support crowdsourcing, messages that are exchanged between a target 150 and a control server or data server 110 to support crowdsourcing may not be used for other purposes such as to support positioning of the target 150. Thus, for example, when a control server 110 sends a message to a target 150 to request the start of crowdsourcing, the message may not include a request for location related information from the target 150 that is not related to crowdsourcing and may not convey assistance data to the target 150 that is not to support crowdsourcing. Similarly, when a target 150 sends a message to a data server 110 containing crowdsourcing measurement data and other crowdsourcing information, the message may not contain location information that is not related to crowdsourcing. Since crowdsourcing may rely on receipt of measurement data from a large number of different target devices, there may be no significant benefit to ensuring that all requested crowdsourcing measurements are made and successfully transferred to the server by each individual target. Therefore, in some embodiments, a congested target or a target with reduced battery charge may be permitted to miss all or some crowdsourcing measurements and be permitted not to expend excessive resources in reconnecting to a server when radio conditions or network support are faulty. Furthermore, if a user will be charged to send measurements, a target may choose not to send crowdsourcing measurements to a server. For example, if a cellular network is being used for which a user would be charged to send data instead of a WiFi network for which data transfer for the user may be free, a target may refrain from sending measurements. In this case, any withheld measurements may be sent later by a target (e.g. using a WiFi network) if batch or quasi-real time reporting is being used by the target.

Crowdsourcing Procedure

Figure 2:
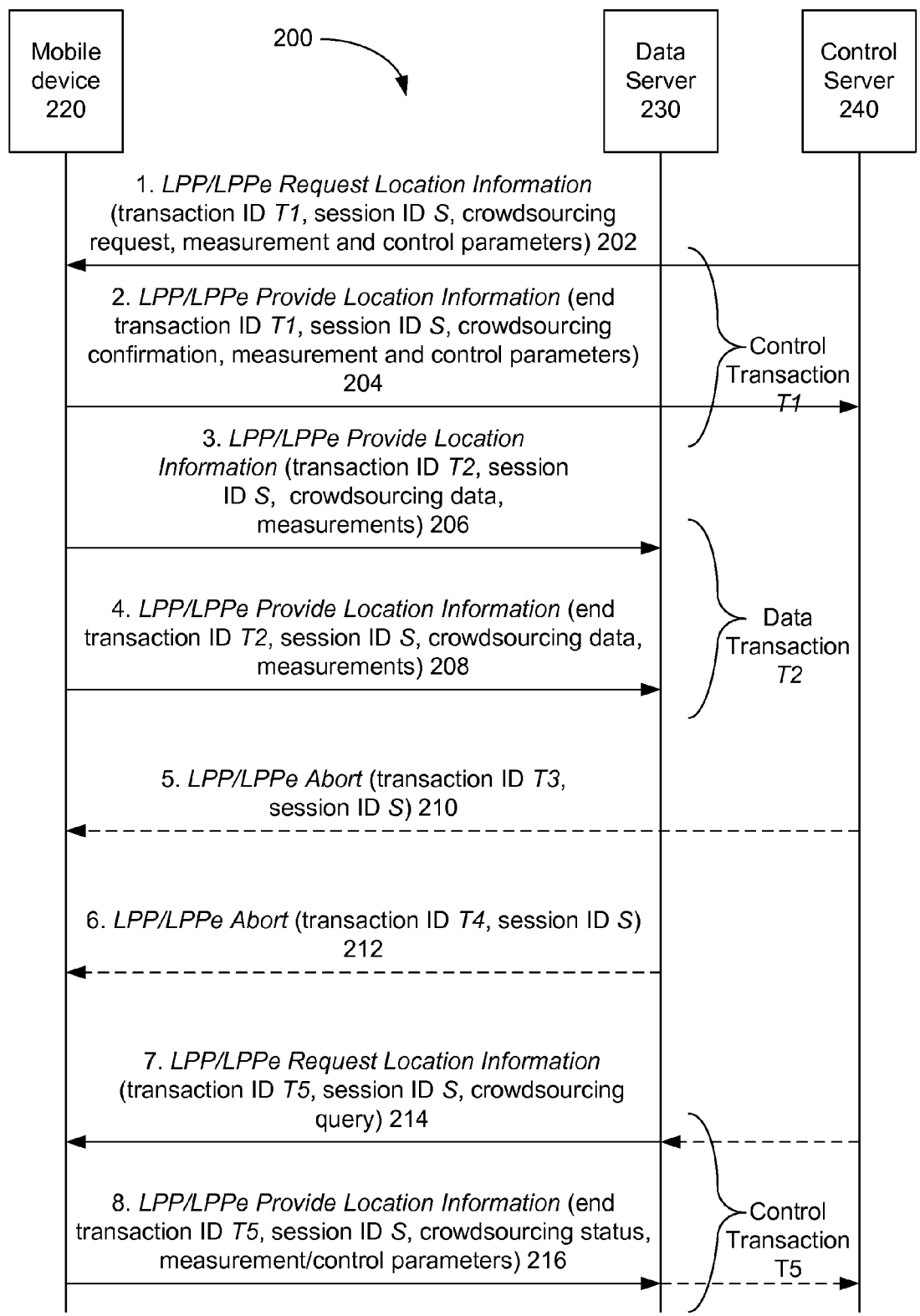
FIG. 2 illustrates an exemplary procedure for performing crowdsourcing, in accordance with some example embodiments.

FIG. 2 illustrates an exemplary procedure 200 for performing crowdsourcing, in accordance with some example embodiments. The procedure 200 in FIG. 2 makes use of the LPP/LPPe positioning protocol for controlling crowdsourcing in a target by a control server and for transferring crowdsourcing measurement related data from a target to a data server and is one example of the techniques described herein for controlling and supporting crowdsourcing. FIG. 2 shows a procedure for requesting crowdsourcing at a mobile device 220 by a control server 240 and for sending crowdsourcing measurement related data from the mobile device 220 to a data server 230. The mobile device 220 may correspond to any of the mobile devices 150 in FIG. 1, the control server may correspond to control server 110-1 or control/data server 110-N in FIG. 1 and the data server may correspond to data server 110-2 or control/data server 110-N in FIG. 1.

In the procedure 200 exemplified in FIG. 2, crowdsourcing is initially requested by the control server 240 at step 1 and accepted and confirmed by the MD 220 at step 2. The MD 220 then sends crowdsourcing measurement related data to a data server at steps 3 and 4 (and possibly at other steps not shown in FIG. 2). At step 5 or 6, the control server 240 or data server 230, respectively, may abort crowdsourcing at the MD 220. Steps 5 and 6 are optional and may not occur in some embodiments. At step 7, the control server 240 or data server 230 may query the MD 220 for the current status of crowdsourcing, in which case the MD 220 may return the current status of crowdsourcing to the control server 240 or data server 230, respectively, at step 8.

A more detailed description of the procedure 200 in FIG. 2 in terms of its support using the LPP/LPPe positioning protocol now follows. As indicated in FIG. 2, a control transaction T1 includes a first step (step 1) and a second step (step 2). At step 1, the control server 240 sends an LPP/LPPe Request Location Information message 202 to the MD 220 using an available LPP transaction ID T1. The message may contain a crowdsourcing session ID S, which may be either unique to the MD 220 or set to an anonymous value such as zero. The message may also contain a crowdsourcing request and measurement parameters, as well as control parameters for obtaining and reporting the measurements. The message may also contain the address of a data server 230 to which crowdsourcing measurements may be sent. If a data server 230 is not indicated, the data server 230 may be assumed by MD 220 to be the same as the control server 240. The measurement parameters included in the LPP/LPPe message may define the crowdsourcing related measurements and other information which the MD 220 is required or allowed to provide to the data server 230 at steps 3 and 4. The control parameters may define the conditions for obtaining and reporting crowdsourcing measurement related data as described herein previously. For example, the control parameters may comprise activation trigger parameters, measurement trigger parameters, reporting trigger parameters, and/or duration trigger parameters as described previously herein.

At step 2, the mobile device 220 may respond with an LPP/LPPe Provide Location Information message 204 to the control server 240. The message may include the LPP transaction ID T1 from step 1 and indicate the end of this transaction. The message may contain a session ID S, which may be either the same as in step 1 or some fixed value (e.g. zero), which may be referred to as a "fixed anonymous value", to indicate anonymous reporting. The message may also contain a confirmation of crowdsourcing, measurement parameters indicating measurements to be crowdsourced, and control parameters for obtaining and reporting the measurements. The measurement parameters may indicate the crowdsourcing measurements and other information that the MD 220 agrees to or is able to provide to the data server 230. The control parameters may indicate the conditions for obtaining and reporting crowdsourcing related data that the MD 220 agrees to or is able to support and may, in one embodiment comprise activation trigger parameters, measurement trigger parameters, reporting trigger parameters, and/or duration trigger parameters. The measurement parameters and the control parameters may be either the same as in step 1 or a subset of those in step 1. A subset of control parameters sent in step 2 may omit certain control parameters in step 1 and/or contain certain control parameters from step 1 set to values indicating a lower frequency and/or lower duration of measurement and/or reporting than values included in step 1. In an embodiment, the measurement parameters and/or the control parameters included in step 2 may contain less detailed information than the corresponding measurement parameters and/or control parameters included in step 1. For example, this may occur with respect to the measurement parameters in steps 1 and 2 when basic crowdsourcing (described later herein) is requested in step 1 and confirmed in step 2 and may be used to avoid defining and implementing new measurement parameters for step 2. If the crowdsourcing request in step 1 will not or cannot be supported by the MD 220, the MD 220 may reject the crowdsourcing request by sending an LPP/LPPe Provide Location Information message in step 2 that indicates the request in step 1 is rejected. In this case, the mobile device 220 may include an error reason in the message but may not include measurement parameters or control parameters. In this case when crowdsourcing will not be supported, subsequent steps in procedure 200 may not be performed.

If the mobile device 220 confirms that crowdsourcing will be supported at step 2, the MD 220 may obtain measurements and other information as defined by the control parameters and measurement parameters returned by the MD 220 in step 2. The obtained measurements and other information may be sent to the data server 230 immediately after being obtained by the MD 220 (e.g. if real time reporting mode was confirmed at step 2) or at some later time (e.g. if quasi-real time mode or batch mode was confirmed by the MD 220 at step 2). In reporting the measurements and other information to the data server 230, the MD 220 may employ a data transaction T2 that includes a first step (step 3) and a second step (step 4).

At step 3, when a set of measurements and other information needs to be sent to the data server 230, the mobile device 220 assembles the measurement data (and other information) into one or more LPP/LPPe Provide Location Information messages 206. If only one LPP/LPPe message is assembled, the mobile device 220 proceeds to step 4 and skips step 3. Otherwise, the MD 220 sends the first batch of measurement data (and other information) to the data server 230 indicated in step 1 in a first LPP/LPPe Provide Location Information message 206. The message may include an available LPP transaction ID T2, which may differ from the transaction ID T1. The message may also include the session ID S in step 2.

The mobile device 220 may repeat step 3 to send each successive set of measurement data (and other information) in successive LPP/LPPe Provide Location Information messages, except for the last set of measurement data (and other information). The totality of measurement data and other information sent at step 3 and step 4 may be referred to as a "measurement report".

In step 4, the last set of measurement data (and other information) may be sent from the mobile device 220 to the data server 230. In step 4, the mobile device 220 may send an LPP/LPPe Provide Location Information message 208 to the data server 230 as in step 3 but with an end of transaction indication also included. In addition, the mobile device 220 may indicate an end of the crowdsourcing session, for example if a duration trigger parameter such as expiration of an overall duration indicates that the session should be ended or if a lack of resources in the mobile device 220 or user intervention causes the mobile device 220 to end the session early. Assuming the session is not ended, steps 3 and 4 may be repeated at later reporting times to send subsequent measurement reports comprising measurements (and other information) from the MD 220 to the data server 230, as determined by the control parameters in step 2. If a session or connection between the mobile device 220 and the data server 230 fails or is released while crowdsourcing transfer according to step 3 and 4 is still in progress, the mobile device 220 may attempt to re-establish the session or connection and resume the transfer. In the case of session re-establishment, the mobile device 220 may not resend any LPP/LPPe Provide Location Information message that was previously completely sent in step 3 or step 4 even if there was no confirmation of receipt at the transport level but may instead resume sending of any additional LPP/LPPe messages that were not yet sent or not completely sent to the data server 230. This process may result in the loss of one LPP/LPPe Provide Location Information message but avoids undetected message duplication at the data server 230, which may otherwise occur with anonymous crowdsourcing or where a data server 230 does not maintain a record of crowdsourcing messages that were received from each target.

The control server 240 or a data server 230 may abort collection of crowdsourcing data from the mobile device 220—for example, if an error related condition occurs or if crowdsourcing measurement related data is no longer needed from the mobile device 220. To abort the crowdsourcing session, the control server 240 may send an LPP/LPPe Abort message 210 to the mobile device 220 at step 5 using an available transaction ID T3 and may include the session ID S from step 2. Similarly, the data server 230 may abort the crowdsourcing session by sending an LPP/LPPe Abort message 212 to the mobile device 220 at step 6 using an available transaction ID T4 and may include the session ID S received in step 3 or step 4.

During the crowdsourcing session, the control server 240 or data server 230 may query the status of crowdsourcing in the mobile device 220. The query may occur while crowdsourcing is being supported by the mobile device 220 on behalf of control server 240 and data server 230 as illustrated in FIG. 2 or may occur when crowdsourcing is not being supported on behalf of one or both of control server 240 and data server 230 (not shown in FIG. 2). To query the status of crowdsourcing, the control server 240 or data sever 230 may send an LPP/LPPe Request Location Information message 214 to the mobile device 220 at step 7 using an available transaction ID T5. The message may indicate a crowdsourcing query and may contain a crowdsourcing session ID S if the control server 240 or data server 230 is aware of an active session with the mobile device 220. For example, the session ID S may be the same as the session ID S received by the control server 240 at step 2 or the session ID S received by the data server 230 at step 3 or step 4. If the control server 240 or data server 230 is not aware of an active crowdsourcing session with the MD 220, the session ID S may be omitted.

In response to step 7, if the MD 220 is able to match an included session ID S in step 7 to an active crowdsourcing session being supported by the MD 220 on behalf of the server that sent the query in step 7 (e.g. the control server 240 or data server 230) or if the MD 220 is able to determine any active crowdsourcing session being supported by the MD 220 on behalf of the server that sent the query in step 7, the MD 220 may return an LPP/LPPe Provide Location Information message 216 to the server that sent the query in step 7 (e.g. the control server 240 or data server 230) at step 8. In this case, the LPP/LPPe message that is returned may use the transaction ID T5 in step 7 and may indicate the end of this transaction. The message may also indicate a crowdsourcing status response and include the session ID S for the active crowdsourcing session with the server that sent the query in step 7 (e.g. the control server 240 or data server 230). In the example shown in FIG. 2, the session ID S returned in step 8 may be the same as the session ID S returned in step 2. The message may also include the measurement parameters and the control parameters in use for the active crowdsourcing session—e.g. the measurement parameters and control parameters returned in step 2. The message may also provide statistics on the crowdsourcing session if available to the mobile device 220. If the mobile device 220 is unable to find an active crowdsourcing session for the server that sent the query in step 7, the mobile device 220 may return an LPP/LPPe Provide Location Information message 216 at step 8 to the server that sent the query in step 7 (e.g. the control server 240 or data server 230) with the transaction ID T5 from step 7, an end of transaction indication, a crowdsourcing status response and an indication that no active session was found. It should be noted that when verifying whether an active crowdsourcing session is being supported on behalf of the server that sent the query at step 7, the MD 220 may identify a crowdsourcing session as being active if the server that sent the query in step 7 is the either the control server, the data server or the control and data server for this session.

When an entity which may be MD 220, control server 240 or data server 230 detects protocol errors in an LPP/LPPe message received from another entity related to crowdsourcing and if the LPP transaction associated with the received LPP/LPPe message is still open, the entity may return an LPP/LPPe ERROR message to the other entity (not shown in FIG. 2) and set the transaction to closed. The received LPP/LPPe message that caused the error may be discarded and any request contained in this message may be ignored, except when the received LPP/LPPe message is an abort or termination request when any ongoing crowdsourcing session may be terminated. Except for the latter case, any crowdsourcing session to which the received LPP/LPPe message in error may have referred may be allowed to continue.

In an embodiment and although not shown in FIG. 2, a control server 240 may first request the capabilities of a mobile device 220 to perform crowdsourcing —e.g. by sending an LPP/LPPe Request Capabilities message to the mobile device 220 prior to step 1 in FIG. 2 that indicates a request for the crowdsourcing capabilities of the mobile device 220. The mobile device 220 may then return its crowdsourcing capabilities to the control server 240, also prior to step 1 in FIG. 2 —e.g. by sending an LPP/LPPe Provide Capabilities message to the control server 240. The crowdsourcing capabilities indicated by the mobile device 220 (e.g. in an LPP/LPPe Provide Capabilities message) may include an indication of whether basic crowdsourcing is supported, an indication of whether advanced crowdsourcing is supported, the control parameters supported by the mobile device 220 for basic crowdsourcing (if supported), the control parameters supported for advanced crowdsourcing (if supported), the measurement parameters (or types of measurements) supported for basic crowdsourcing (if supported) and the measurement parameters (or types of measurements) supported for advanced crowdsourcing (if supported). The crowdsourcing capability information sent to the control server 240 by the mobile device 220 may assist the control server 240 to determine whether to invoke crowdsourcing by the mobile device at step 1 in FIG. 2, and if so which control parameters and measurement parameters to include in the request at step 1. For example, the control server 240 may only include control parameters and measurement parameters in the request that are indicated as supported by the mobile device 220. In addition or alternatively, the control server 240 may not include control parameters and measurement parameters that are implied to be not supported by the mobile device 220.

Basic and Advanced Crowdsourcing

Two types of crowdsourcing may be supported in a positioning protocol such as LPP combined with LPPe: (1) "basic crowdsourcing;" and (2) "advanced crowdsourcing." Basic crowdsourcing may use measurement parameters in a request for crowdsourcing sent from a control server to a mobile device (e.g. as described for step 1 in FIG. 2) that are similar to or the same as parameters use to request location related measurements from a mobile device in the event that a server needs to obtain the position of the mobile device rather than instigate crowdsourcing. With basic crowdsourcing, a mobile device may confirm support for crowdsourcing (e.g. as described for step 2 in FIG. 2) by returning measurement parameters to the control server that contain less information than the measurement parameters received from the control server (e.g. as at step 1 in FIG. 2). For example, a control server may identify requested crowdsourcing measurement data by sending measurement parameters to a mobile device (e.g. as at step 1 in FIG., 2) that include (i) requested position methods such as Enhanced Cell ID (E-CID) for LTE, E-CID for WCDMA, E-CID for GSM, Observed Time Difference of Arrival (OTDOA) for LTE or OTDOA for WCDMA and (ii) requested measurements or measurement types for each of or for some of the requested position methods. These measurement parameters may be the same as would be sent by a server to request the same position methods and measurements when a server wishes to obtain the location of the mobile device. The mobile device may confirm the requested measurement related data by returning a response to the control server (e.g. as at step 2 in FIG. 2) that includes measurement parameters that identify the position methods requested by the control server that the mobile device agrees to or is able to provide but excludes any identification of particular measurements that the mobile device will support for each position method. When a mobile device later sends one or more messages containing crowdsourcing related measurement data to a data server (e.g. as at steps 3 and 4 in FIG. 2) using basic crowdsourcing, the messages may be similar to or the same as messages that a mobile device would return to a server to provide measurements and/or other location related information in the case that the server had requested measurements and/or other location related information from the mobile device in order to obtain the location of the mobile device.

The use of measurement parameters and crowdsourcing related measurement data for basic crowdsourcing that are similar to or the same as measurement parameters and measurement data, respectively, for obtaining the location of a mobile device at server may reduce implantation impacts to support basic crowdsourcing at a location server and/or at a mobile device. Control parameters used for basic crowdsourcing (e.g. as used for steps 1, 2, and 8 in FIG. 2) may be the same as control parameters used for advanced crowdsourcing (described herein next) or may be simpler—e.g. may be a subset of the control parameters used for advanced crowdsourcing. In the case that the LPP/LPPe positioning protocol is used to support crowdsourcing (e.g. as described herein in association with FIG. 2), basic crowdsourcing may reuse existing LPP and LPPe positioning parameters for some of the measurement parameters (e.g. the measurement parameters in step 1 in FIG. 2) and for sending crowdsourcing measurement related data (e.g. as at steps 3 and 4 in FIG. 2) and thus may reduce implementation though may not always be efficient for a large number of crowdsourcing measurements.

Advanced crowdsourcing may uses control parameters and measurement parameters (e.g. at steps 1, 2 and 8 in FIG. 2) and parameters to convey crowdsourcing measurement related data (e.g. as at steps 3 and 4 in FIG. 2) that are applicable only to crowdsourcing and are not used to request and return measurements and other location information between a location server and mobile device for the purpose of positioning the mobile device. The control parameters, measurement parameters and parameters used to return crowdsourcing related measurement data can be dedicated to crowdsourcing and can be more efficient—e.g. can reduce message size, signaling and data storage in comparison to what would be used with basic crowdsourcing. The improved efficiency of advanced crowdsourcing may apply particularly for batch reporting mode due to a possibility with advanced crowdsourcing of more efficiently packing and compressing measurement related data being sent to a data server from multiple occasions when a mobile device had obtained and stored measurement related data.

In some embodiments, only one type of crowdsourcing (basic or advanced) may be requested by a control server 240 (e.g. at step 1 in FIG. 2) and used by a mobile device 220 throughout a crowdsourcing session (e.g. at steps 3 and 4 in FIG. 2). Basic crowdsourcing may be used for coarse infrequent provision of crowdsourcing data by a mobile device or may be used with a control server 240, data server 230 or a mobile device 220 that cannot support advanced crowdsourcing. Advanced crowdsourcing may be used for any precise or frequent provision of crowdsourcing data by a mobile device if supported by the control server 240, the data server 230 and the mobile device 220.

Figure 3A:
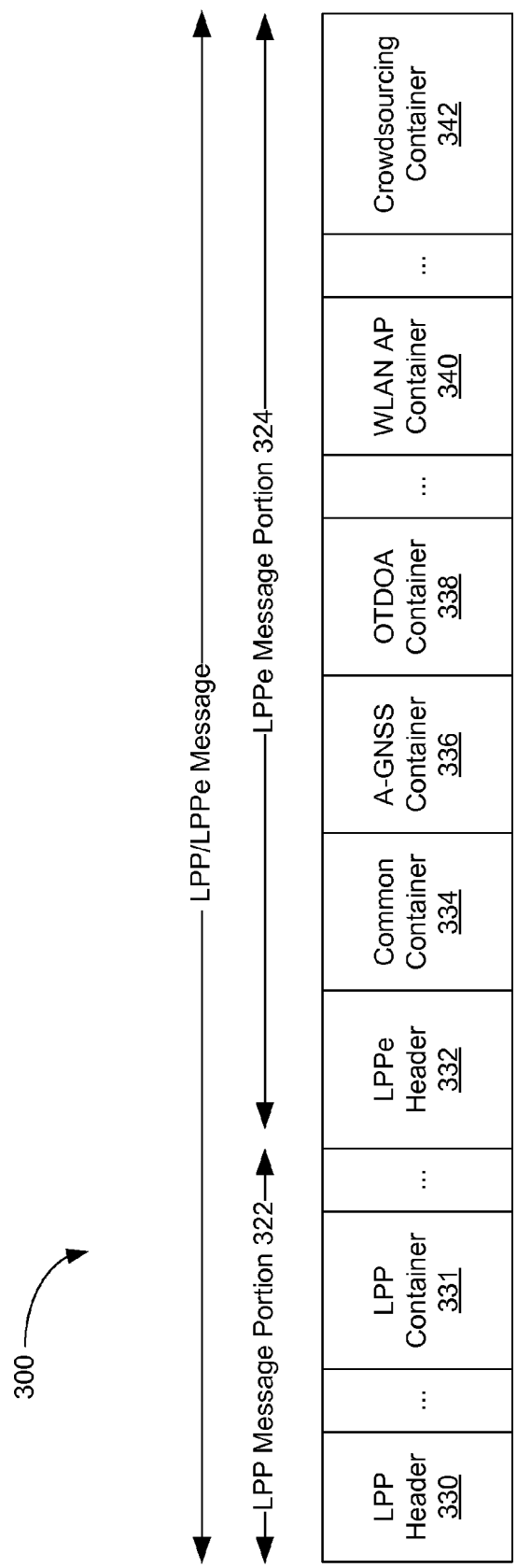
FIGS. 3A-3C provide an example of how basic crowdsourcing and advanced crowdsourcing may be supported by the LPP/LPPe positioning protocol.
Figure 3B:
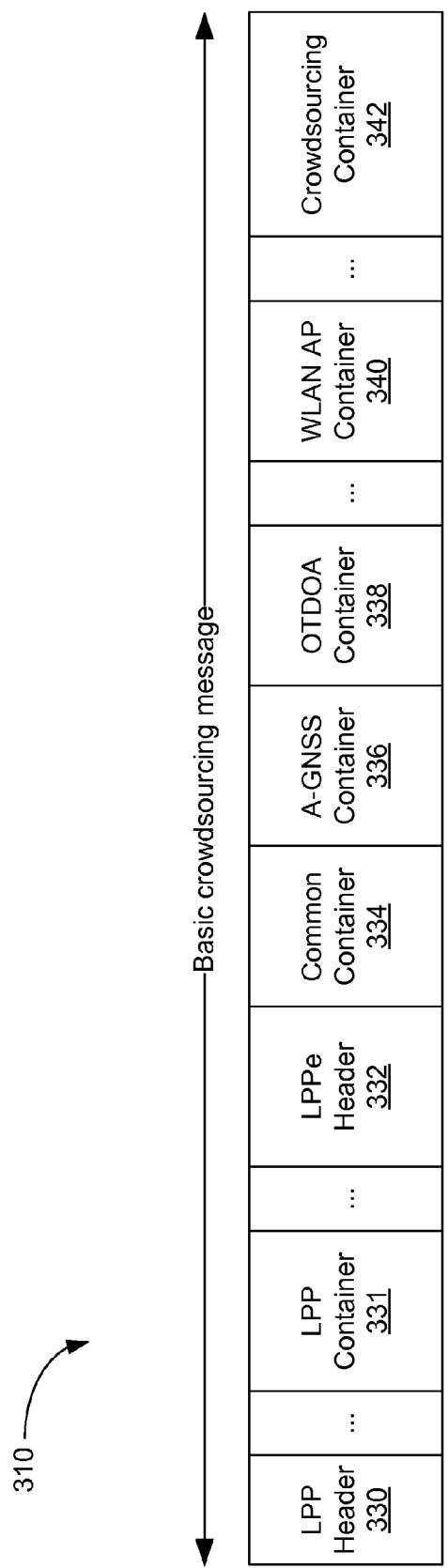
Figure 3C:
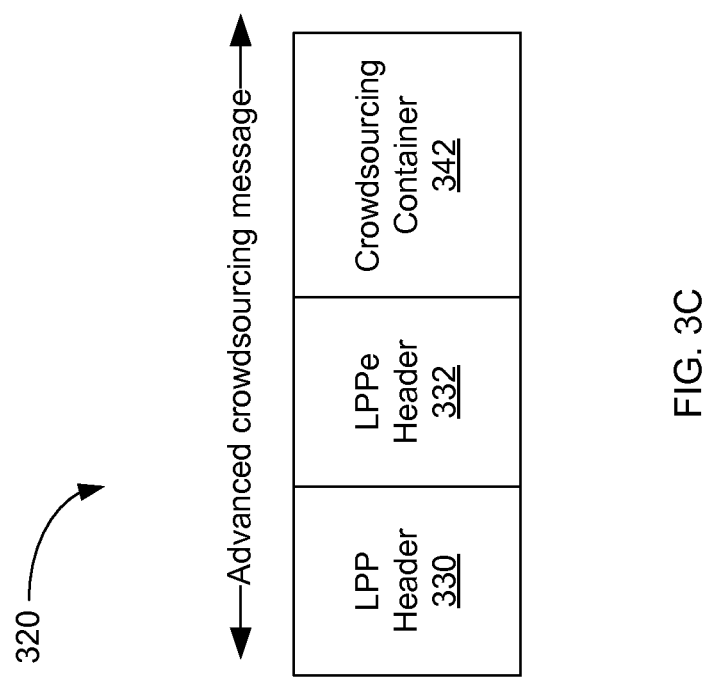

An example of how basic crowdsourcing and advanced crowdsourcing may be supported by the LPP/LPPe positioning protocol is provided in FIGS. 3A-3C which summarize the different portions of an LPP/LPPe message and the applicability of these different LPP/LPPe message portions to basic crowdsourcing and advanced crowdsourcing, in accordance with some example embodiments. FIG. 3A shows various portions of an LPP/LPPe message 300. FIG. 3B shows a basic crowdsourcing LPP/LPPe message 310. FIG. 3C shows an advanced crowdsourcing LPP/LPPe message 320.

The LPP/LPPe message 300 shown in FIG. 3A shows different portions of an LPP/LPPe message that may be applicable to positioning of a mobile device by a location server or by the mobile device as well as to crowdsourcing. The different message portions, also referred to herein as parameter containers, may each comprise separate message parameters and other message information and may occupy different portions of the message (e.g. different non-overlapping sets of bits or octets within the overall LPP/LPPe message). The different message portions may include an LPP message portion 322 and an LPPe message portion 324. The LPP message portion 322 may include an LPP Header 330 and an LPP parameter container 331. In some embodiments, the LPP parameter container 331 may be a parameter container for the E-CID position method for LTE, a parameter container for the OTDOA position method for LTE or a common parameter container. Although FIG. 3A only shows one LPP parameter container 331, the LPP message portion 322 may contain more than one LPP parameter container 331 in some embodiments. The LPPe message portion 324 may include message portions corresponding to an LPPe Header 332, a Common Container 334, an A-GNSS Container 336, an OTDOA for LTE Container 338, a WLAN AP Container 340 and a Crowdsourcing Container 342. There may be other message portions within the LPPe message portion 324 that are not shown in FIG. 3A—e.g. message portions supporting other position methods such as E-CID for LTE, E-CID for WCDMA, E-CID for GSM and/or SRN positioning. The LPP message portion 322 may correspond to the portion of the LPP/LPPe message 300 that contains LPP parameters and is as defined for the LPP protocol—e.g. by 3GPP technical specification 36.355 which is publicly available. The LPPe message portion 324 (including the Common Container 334, A-GNSS Container 336, OTDOA for LTE Container 338, WLAN AP Container 340 and Crowdsourcing Container 342) may correspond to the portion of the LPP/LPPe message 300 that contains LPPe parameters and is as defined for the LPPe protocol by OMA.

In an embodiment, one or more of the message portions described above herein and shown in FIG. 3A may be included in certain messages used to support crowdsourcing (e.g. messages used to support basic and/or advanced crowdsourcing corresponding to messages transferred in the exemplary procedure 200 of FIG. 2) but, except for the Crowdsourcing Container 342, may not be defined differently for use with crowdsourcing compared with use to position or assist in positioning a mobile device. In this embodiment, the signaling impacts to the LPPe protocol used to support crowdsourcing may be restricted to the crowdsourcing container 342. The crowdsourcing container 342 may then be used to support crowdsourcing (e.g. may be included in all LPP/LPPe messages transferred to support crowdsourcing such as each of the messages transferred in steps 1 to 8 in FIG. 2) and may not be included in LPP/LPPe messages used to support positioning of a mobile device rather than crowdsourcing. The Crowdsourcing Container 342 may contain control parameters and measurement parameters (e.g. as used for steps 1, 2 and 8 in FIG. 8) and may include parameters used to transfer crowdsourcing measurement related data for advanced crowdsourcing (e.g. as used in steps 3 and 4 of FIG. 2).

For basic crowdsourcing, control parameters (e.g. as used in steps 1, 2 and 8 in FIG. 2) and measurement parameters confirming crowdsourcing measurements to be obtained by a mobile device (e.g. as in step 2 of FIG. 2) may both be contained in the LPPe crowdsourcing container 342. Measurement parameters indicating the basic crowdsourcing measurements requested (e.g. as in step 1 in FIG. 2) and parameters used to convey basic crowdsourcing measurement related data (e.g. as in steps 3 and 4 of FIG. 2) may each be contained in the same LPP and LPPe parameter containers used to request these measurements or convey these measurements when used for positioning of a target. For example, these parameter containers may include one or more LPP parameter containers 331, the Common Container 334, the A-GNSS Container 336, the OTDOA for LTE Container 338, the WLAN AP Container 340 and/or other LPPe parameter containers.

An LPP/LPPe message 310 transferred to support basic crowdsourcing may be as exemplified in FIG. 3B. In FIG. 3B, basic crowdsourcing measurement parameters used to request basic crowdsourcing (e.g. as in step 1 of FIG. 2) and basic crowdsourcing measurement data (e.g. for steps 3 and 4 in FIG. 2) are contained in the same LPP and LPPe parameters that are used to request and report these measurements, respectively, in the case of positioning of a mobile device. These parameters may thus appear in the LPP and LPPe parameter containers for LPP and LPPe positioning methods. For basic crowdsourcing, measurement parameters providing a detailed confirmation of the measurements to be crowdsourced by a target may not be provided to a server (e.g. in steps 2 and 8 of FIG. 2). Instead, summary indication of the position methods for which basic crowdsourcing measurements will be provided by a mobile device may be provided in the crowdsourcing container 342.

As shown in FIG. 3C for advanced crowdsourcing, an advanced crowdsourcing message 320 may only include an LPP Header 330, an LPPe Header 332 and a Crowdsourcing Container 342. The LPP parameter container 331, Common Container 334, A-GNSS Container 336, OTDOA for LTE Container 338, WLAN AP Container 340 and other LPPe parameter containers may not be included. The Crowdsourcing Container 342 may include the control parameters (e.g. for steps 1, 2 and 8 of FIG. 2), the measurement parameters (e.g. for steps 1, 2 and 8 of FIG. 2) and the parameters conveying crowdsourcing measurement related data (e.g. for steps 3 and 4 of FIG. 2). For advanced crowdsourcing, LPP and LPPe parameter containers associated with normal positioning methods may not be included.

Table 1 summarizes the different parts of an LPP and LPPe message that are applicable to basic crowdsourcing and advanced crowdsourcing in some embodiments. The table shows the different types of LPP/LPPe messages in the first column that were previously standardized in the LPP and LPPe specifications, the different types of crowdsourcing information types in the second column that may be included each LPP/LPPe message type and the LPP/LPPe parameter container(s) that may be used to convey each crowdsourcing information type using basic crowdsourcing (third column) and advanced crowdsourcing (fourth column). For example, for the LPP/LPPe Request Location Information message type (first column, third row), the crowdsourcing information types that may be included in this message type comprise Requested Control Parameters (second column, third row) and Requested Measurement Parameters (second column, fourth row). Table 1 shows that the Requested Control Parameters would be conveyed in the crowdsourcing container for both basic crowdsourcing (third column, third row) and advanced crowdsourcing (fourth column, third row). Similarly, Table 1 shows that the Requested Measurement Parameters would be conveyed in position method specific parameter containers for basic crowdsourcing (third column, fourth row) and the crowdsourcing container for advanced crowdsourcing (fourth column, fourth row).

TABLE 1

| LPP/LPPe Message Type | Crowdsourcing Information Type | Container for Basic Crowdsourcing | Container for Advanced Crowdsourcing |
|---|---|---|---|
| Request/ Provide Capabilities | Crowdsourcing capabilities | Crowdsourcing Container | Crowdsourcing Container |

TABLE 1-continued

| LPP/LPPe Message Type | Crowdsourcing Information Type | Container for Basic Crowdsourcing | Container for Advanced Crowdsourcing |
|---|---|---|---|
| Request Location Information | Requested Control Parameters | Crowdsourcing Container | Crowdsourcing Container |
| | Requested Measurement Parameters | Position method specific parameter containers | Crowdsourcing Container |
| Provide Location Information | Confirmed Control Parameters | Crowdsourcing Container | Crowdsourcing Container |
| | Confirmed Measurement Parameters | Crowdsourcing Container (in an abbreviated form) | Crowdsourcing Container |
| | Reported Crowdsourcing Measurement related data | Position method specific containers plus a few measurements (e.g. date/time and target location) in the Crowdsourcing Container. | Crowdsourcing Container |

Measurement Sets and Measurement Subsets

A crowdsourcing measurement set may comprise all measurements that were obtained by a target as a result of a particular instigation of measurements by measurement trigger parameters (e.g. all measurements obtained due to one timeout instance of a 20-minute periodic measurement trigger parameter). A measurement set may need to be obtained over a short period of time by a target (e.g. a few seconds or even a few minutes) depending on the number of measurements and the time needed for each measurement. During the period in which measurements in a particular measurement set are being obtained by a target, the target may move in which case it may not be possible for the target to report a precise single location for all measurements. Therefore, each measurement set may be divided by a target into a sequence of measurement subsets obtained at successively later times where each measurement subset contains measurements that were obtained by a target at the same or nearly the same location.

If a target does not obtain any measurements when a particular measurement set is triggered by measurement trigger parameters, as for example when no required measurements are available to be obtained by the target, the target may not provide information to the server concerning the measurement set. If measurements are available to be obtained when a particular measurement set is triggered, but a target is unable to obtain any measurements (e.g. due to inadequate resources), the target may either send no information to the server concerning the measurement set or send error information. In some cases, an error information message is sent sparingly in order to reduce signaling—e.g. when an inability to obtain measurements by a target persists over a predetermined number of measurement sets.

In some embodiments for basic crowdsourcing, each measurement subset (or each measurement set that comprises just one measurement subset) is contained in a separate LPP/LPPe Provide Location Information message from any other measurement subset (or measurement set). In some embodiments for advanced crowdsourcing, a single LPP/LPPe Provide Location Information message may contain many (e.g. up to 512) separate measurement subsets which may all belong to the same measurement set or may belong to two or more consecutive measurement sets. This packing of many measurement subsets and possibly many measurement sets into a single LPP/LPPe message for advanced crowdsourcing may reduce the amount of signaling needed to convey crowdsourcing measurement related date from a target to a data server and thereby reduce resource usage and network usage charges for the user of a target device and the operator of a data server. Optionally, a control server may indicate (e.g. in the control parameters) the maximum distance that a target is allowed to move while obtaining crowdsourcing measurements to be included in the same measurement subset, as a means of controlling the precision of the reported target location for each measurement subset. If the target moves while a measurement set is being obtained (e.g. moves by more than any maximum distance allowed by the control server for including measurements in the same measurement subset), the measurement set may be reported using more than one measurement subset. Conversely, if target moves by less than the maximum distance allowed by the control server for including measurements in the same measurement subset while obtaining measurements for a single measurement set, the target may report measurements for the measurement set using just one measurement subset. Each measurement subset that is reported by a target may include information that indicates the time or relative time at which the included measurements were obtained and may indicate the target location. The target location may be provided as an absolute location and/or as a location relative to the target location reported for a previous measurement subset. Certain measurement subsets, for example those for which an absolute target location is provided, may be designated as anchor points and may be referenced by later measurement subsets in order to provide target locations for the later measurement subsets that are defined relative to the target location for the measurement subset designated as an anchor point. This may allow the absolute target location for a later measurement subset to be obtained from an absolute target location provided or derivable for an earlier measurement subset designated as an anchor point. An absolute target location for an earlier measurement subset (e.g. designated as an anchor point) may also be obtained from an absolute target location for a later measurement subset if the target location for the later measurement subset is also provided as a location relative to the target location for the earlier measurement subset.

In addition to allowing measurements for the same measurement set that were made at different target locations to be reported in association with a precise target location, multiple measurement subsets may also be reported by a target to increase the number of reported measurements when a single measurement subset cannot include them all. As an example, this may be used to enable a target to report measurements for multiple channels for the same WLAN AP or to report measurements for multiple frequencies for the same cell.

Crowdsourcing Control Parameters

As previously described herein, crowdsourcing control parameters may be used to control a crowdsourcing session—e.g. may be included in a request for crowdsourcing sent from a control server to a target (e.g. such as at step 1 of FIG. 2), may be included in a confirmation of crowdsourcing sent from a target to a control server (e.g. such as at step 2 of FIG. 2) and may be included in a message sent from a target to a control server or data server (such as at step 8 of FIG. 2) in response to a status query received by the target from this control server or data server. As also described previously herein, control parameters may comprise one or more of (1) activation trigger parameters; (2) measurement trigger parameters; (3) reporting trigger parameters; and/or (4) duration trigger parameters.

As described herein previously, activation trigger parameters may indicate the conditions (e.g. trigger conditions) for activating and deactivating crowdsourcing at a target. If crowdsourcing has been activated according to the activation trigger parameters, a target may obtain measurements and other information according to the measurement triggers parameters and may report the measurements and other information according to the reporting trigger parameters. While crowdsourcing is deactivated (or not yet activated) according to the activation trigger parameters, a target may not obtain measurements and other information but may continue to report, according to the reporting trigger parameters, any previously obtained measurements and other information that were not yet sent to the data server. Crowdsourcing may be activated by the detection of an activation trigger condition that is defined by one or more of the activation trigger parameters and may be deactivated either when no activation trigger conditions are detected or when any deactivation trigger condition, that may be defined by one or more of the activation trigger parameters, is detected regardless of activation trigger conditions. If no activation trigger parameters are present (e.g. are not included in a request for crowdsourcing from a control server or a confirmation of crowdsourcing by a target), crowdsourcing may be considered by a target as always activated.

Measurement trigger parameters may indicate the conditions (e.g. trigger conditions) for obtaining a new set of measurements by a target—e.g. by obtaining and later returning a measurement set comprising one or more measurement subsets as previously described herein. If no measurement trigger parameters are present (e.g. are not included in a request for crowdsourcing from a control server or a confirmation of crowdsourcing by a target), measurements may be obtained by a target at fixed periodic intervals (e.g. of 15 minutes).

Reporting trigger parameters may indicate the conditions (e.g. trigger conditions) for reporting each new set of measurements and other information by a target to a data server. If no reporting trigger parameters are present (e.g. are not included in a request for crowdsourcing from a control server or a confirmation of crowdsourcing by a target), a target may be allowed to decide when to send measurement reports to the server which may occur either in real time or in batches.

Duration trigger parameters may indicate the duration of crowdsourcing—e.g. may indicate the conditions (e.g. trigger conditions) for starting and stopping a crowdsourcing session. If no duration trigger parameters are present (e.g. are not included in a request for crowdsourcing from a control server or a confirmation of crowdsourcing by a target), a target may assume that crowdsourcing should start immediately and continue for an unlimited duration. In some embodiments, an unlimited duration may later be terminated by the server or target.

In some embodiments, as previously described, control parameters may include a location precision parameter to control the precision of the reported target location at which the target obtained a measurement subset (e.g. that may be reported as part of a measurement set). In some embodiments, the location precision parameter may indicate the maximum distance in meters that a target may move while performing consecutive crowdsourcing measurements that will be included in the same measurement subset. When obtaining crowdsourcing measurements, a target may monitor its location (e.g. using internal sensors) and divide the measurements that are obtained into subsets that satisfy the requirement implied by the location precision parameter. If no location precision parameter is present (e.g. is not included in a request for crowdsourcing from a control server or a confirmation of crowdsourcing by a target), a target may determine any location precision itself.

In some embodiments, activation trigger parameters may comprise one or more of the following parameters: a geographic area parameter; an activation area parameter; a deactivation area parameter; a country-network parameter; a detected transmitters parameter; a target motion state parameter; an environment parameter; a logical trigger combination parameter; an activation delay parameter; and a deactivation delay parameter. These activation trigger parameters are described herein next for some example embodiments.

The geographic area parameter may provide a set of geographic areas within which crowdsourcing should be activated or deactivated by a target. When this parameter is omitted, there may be no geographic area condition for activating or deactivating crowdsourcing. A geographic area parameter may include a plurality (e.g. up to 16 each) of activation areas and/or deactivation areas. An activation area and a deactivation area may each be defined as a geographic area (e.g. defined using a circle or polygon). When a target is within an activation area, the target may be required to activate crowdsourcing. When a target is within a deactivation area, the target may be required to deactivate crowdsourcing. When a target is within both an activation area and a deactivation area (e.g. for overlapping areas), the target may be required to deactivate crowdsourcing in one embodiment.

The country-network parameter may indicate whether a target needs to be within wireless coverage of a certain type of network or be within a particular country in order for crowdsourcing to be activated. For example, the country-network parameter may comprise the following conditions that may be detected by a target: (i) being in coverage of the home network for the target, (ii) being in the home country for the target but not in coverage of the home network and/or (iii) not being in the home country. The country-network parameter may be encoded as a bit string with each network or country condition represented by a different bit. A bit may be set to one to indicate that crowdsourcing should be activated when the corresponding network or country condition is detected. A bit may be set to zero to indicate that crowdsourcing shall be deactivated for the corresponding network or country condition. A bit that is not included may indicate that the associated network or country condition can be ignored. This country-network parameter may be optional and if not included may indicate that network and country conditions do not affect crowdsourcing. In some embodiments, a target may deactivate crowdsourcing if at least one activation trigger condition (e.g. a country-network condition or a geographic area condition) is detected for which crowdsourcing should be deactivated even if another condition is present for which crowdsourcing should be activated.

The detected transmitters parameter may provide a count of the minimum number of transmitters (e.g. comprising APs, BSs and Femtocells) that need to be visible to a target at the same time to activate crowdsourcing. This parameter may not be used to explicitly deactivate crowdsourcing when crowdsourcing is already activated and the minimum number of transmitters is not detected. The transmitters that are counted by a target in association with this parameter may only include transmitters for which crowdsourcing measurements have been requested by a control server (e.g. using the measurement parameters). For example, if a target receives signals from five WiFi APs, three LTE eNode Bs and four WCDMA node Bs and crowdsourcing was requested for WiFi and LTE but not for WCDMA, the number of detected transmitters would be eight. When this parameter is omitted, the number of detected transmitters may not be a condition for crowdsourcing in some embodiments.

The target motion state parameter may provide a set of target motion states that, when detected by a target, may each activate crowdsourcing. The parameter may be encoded as a bit string in some embodiments with each motion state represented by a different bit. In an embodiment, separate bits may each represent the following motion states: unknown, stationary, walking, running, cycling, being in a car, being on a train, being on a boat, some other state. A bit may set to one to indicate that crowdsourcing should be activated when the corresponding motion state is detected. A bit may be set to zero to indicate that crowdsourcing shall be deactivated when the corresponding motion state is detected. A bit that is not included may indicate that the associated motion state can be ignored. The target motion state parameter may be used to help ensure high target location accuracy during crowdsourcing by restricting crowdsourcing to target motion states with low velocity. The target motion state parameter may be optional in some embodiments and if not included may indicate that the target motion state does not affect crowdsourcing.

The environment parameter may indicate a set of environments that may activate crowdsourcing—e.g. when a target detects that it is within one or more environments in the set. The environment parameter may be encoded as a bit string in some embodiments with each environment represented by a different bit. In an embodiment, separate bits may represent the following environments: unknown, indoors, outdoors. A bit may be set to one to indicate that crowdsourcing should be activated when the corresponding environment is detected by a target. A bit may be set to zero to indicate that crowdsourcing shall be deactivated when the corresponding environment is detected. A bit that is not included may indicate that the associated environment can be ignored by a target. This parameter may be optional in some embodiments and if not included may indicate that the environment does not affect crowdsourcing.

The logical trigger combination parameter may indicate how other activation trigger parameters are to be combined. For example, the parameter may be used to reconcile inconsistency when one or more activation parameters or parameter values indicate crowdsourcing activation and one or more other activation parameters or parameter values indicate crowdsourcing deactivation or lack of a condition for activation. If the logical trigger combination parameter is set to a value of "or", other activation triggers may be combined via a logical OR operation such that crowdsourcing may be activated if and only if at least one condition for activation is detected and provided no condition for deactivation is detected. If the logical trigger combination parameter is set to a value of "and", activation triggers may be combined via a logical AND operation such that crowdsourcing may be activated if and only if any activation trigger parameters that are included to indicate activation (e.g. from among the geographic area parameter, country-network parameter, detected transmitters parameter, target motion state parameter and environment parameter) all indicate activation and provided no trigger condition for deactivation is detected. The logical trigger combination parameter may be optional and if not included may have the default value "and" in one embodiment. In an embodiment, deactivation conditions (or trigger conditions) may take precedence over activation conditions such that crowdsourcing may be deactivated if any one deactivation condition is detected regardless of any activation conditions. Furthermore, in an embodiment, crowdsourcing may be deactivated when no activation triggers (as combined using logical OR or AND operations according to the logical trigger combination parameter) are detected.

The activation delay parameter may provide the minimum duration (e.g. in units of 5 seconds) for which trigger conditions that activate crowdsourcing must continuously persist before crowdsourcing is activated by a target. The activation delay parameter may help avoid unnecessary transient crowdsourcing when a target is at a location where crowdsourcing is generally not needed. The activation delay parameter may be optional and have a default value of zero in one embodiment when not included.

The deactivation delay parameter may provide the minimum duration (e.g. in units of 5 seconds) for which trigger conditions that deactivate crowdsourcing must continuously persist before crowdsourcing is deactivated by a target. The deactivation delay parameter may help avoid unnecessary transient deactivation of crowdsourcing when a target is at a location where crowdsourcing is generally needed. The deactivation delay parameter may be optional and may have a default value of zero in one embodiment when not included.

In some embodiments, measurement trigger parameters may comprise one or more of the following parameters: a measurement periodicity parameter, a measurement movement parameter, a measurement floor change parameter, a measurement change of Serving Cell or AP parameter, and a logical measurement combination parameter. These measurement trigger parameters are described herein next for some example embodiments.

The measurement periodicity parameter may be used to define periodic crowdsourcing measurements and may provide the periodicity (e.g. in units of 10 seconds) for obtaining new sets of crowdsourcing measurements by a target when crowdsourcing is activated. A measurement periodicity condition may be detected by a target once the period since the last set of crowdsourcing measurements obtained by the target attains or exceeds the periodicity value.

The measurement movement parameter may provide the minimum distance (e.g. in units of 5 meters) that a target must move before a new set of crowdsourcing measurements (e.g. a new measurement set) may be obtained by a target. Movement of a target may be equated in one embodiment to the straight line distance (or an estimate of the straight line distance) between a previous and a new target location. The measurement movement parameter may be optional and when omitted may indicate that target movement is not a factor in determining when to obtain measurements.

The measurement floor change parameter when present may indicate that a target should make a new set of crowdsourcing measurements when the target can determine that it is indoors and has changed floor level. To avoid instigating measurements due to floor levels whose occurrence is transient (e.g. for a target inside an elevator), in one embodiment a target may wait until its floor level appears stable before making new measurements. The measurement floor change parameter may be optional and when omitted may indicate that change of floor level is not a direct factor in determining measurements. As an option, in some embodiments, a target may wait for some short random period (e.g. 0 to 30 seconds) before obtaining measurements due to the triggering by the measurement floor change parameter in order to avoid measurements being made at the same locations by all targets (e.g. at the entrance to an elevator or escalator).

The measurement Change of Serving Cell or AP parameter may indicate when present that a new set of crowdsourcing measurements should be obtained whenever a target changes its current serving cell or serving access point or changes to or from cellular access (e.g. from or to a WLAN AP or Bluetooth AP). The measurement Change of Serving Cell or AP parameter may be optional and if not present may indicate that change of serving cell or AP is not a factor in determining when to obtain measurements.

The logical measurement combination parameter may indicate how other measurement triggers are to be combined. If the logical measurement combination parameter is set to a value of "or", measurement triggers may be combined in one embodiment via a logical OR operation such that a new set of crowdsourcing measurements is obtained if and only if at least one measurement trigger condition for obtaining measurements is detected by a target. If the logical measurement combination parameter is set to a value of "and", measurement triggers may be combined in one embodiment via a logical AND operation such that a new set of crowdsourcing measurements is obtained if and only if all measurement trigger conditions that are included for obtaining measurements are detected at the same time. For the "and" value in one embodiment, measurement trigger conditions may be concurrently detected (e.g. a measurement trigger condition that was previously detected but no longer applies may count as not being detected). The logical measurement combination parameter may be optional and if not included may have the default value "or" in some embodiments.

In some embodiments, reporting trigger parameters may comprise one or more of the following parameters: a real time parameter, a quasi-real time parameter, a batch parameter, a batch report periodicity parameter, a batch report movement parameter, a batch report on change of serving network parameter, a batch access network restriction parameter, and a batch storage overflow parameter. In some embodiments, the batch parameter but not the real time parameter or quasi-real time parameter may comprise, or occur in combination with, one or more of the batch report periodicity parameter, the batch report movement parameter, the batch report on change of serving network parameter, the batch access network restriction parameter and the batch storage overflow parameter. The reporting trigger parameters are described herein next for some example embodiments.

The real time parameter may indicate when it is present that reporting of crowdsourcing measurements to a data server by a target shall occur in real time. In this case, a target may attempt to send each new set of crowdsourcing measurements to the data server as soon as a complete measurement set has been obtained. If this is not possible (e.g. if a connection to the data server cannot be established by a target or is inhibited by a user preference to use only certain access networks), then the measurements may be discarded by a target and not sent to the data server. In some embodiments, a target may verify that some or all of the conditions for being able to access the data server are present (e.g. such as the availability of a suitable access network) before making crowdsourcing measurements to avoid wasting resources in unnecessary measurement.

The quasi-real time parameter may indicate when it is present that reporting of crowdsourcing measurements to a data server by a target shall occur in quasi-real time. In this case, a target may attempt to send each new set of crowdsourcing measurements to the data server as soon as a complete measurement set has been obtained. If this is not possible (e.g. if a connection to the data server cannot be established or is inhibited by a user preference to use only certain access network) then the measurements may be stored by the target and sent to the data server at a later time (e.g. along with other measurement sets that were also deferred) when a connection to the data server is again possible. If storage in the target for measurements is completely filled before the measurements can be reported, the oldest measurements may be discarded in one embodiment in order to store new measurements.

The batch parameter may indicate when it is present that reporting of crowdsourcing measurements to a data server by a target shall occur only at certain times indicated by other reporting trigger parameters. In this case, a target may store each set of crowdsourcing measurements and send all stored sets only when allowed by other reporting trigger parameters. The reporting triggers (e.g. the reporting triggers defined by the reporting trigger parameters described next herein except for the access network restriction parameter) may be combined by a logical "OR" operation in some embodiments. In some embodiments, once a batch report is sent (e.g. comprising all measurement sets obtained previously and stored in a target), the measurement sets that were sent may be removed from a target's storage and the initial conditions for each reporting trigger may be reset. For example, any periodicity associated with the batch report periodicity parameter or any determination of target movement for the batch report movement parameter may be restarted. It should be noted that if a condition for sending a batch report to a data server occurs in a target when there are no stored measurements to send, the target may ignore the condition in one embodiment or later send any new measurements immediately they are obtained in another embodiment.

In some embodiments, only one of the real time parameter, quasi-real time parameter and batch parameter may be present in the reporting trigger parameters in order to avoid conflicting trigger conditions. In some of these embodiments, reporting trigger parameters used for batch reporting may only be included in reporting trigger parameters when the batch parameter is included.

The batch report periodicity parameter may indicate the periodicity of batch reporting (e.g. in units of 15 minutes and in a range of 15 minutes to 7 days). In some embodiments, batch reports may be sent by a target with at least the periodicity indicated by the batch report periodicity parameter except when precluded by conditions defined by the access network parameter.

The batch report movement parameter may provide the maximum distance (e.g. in units of 1 kilometer) that a target may move before a new batch report should be sent to a data server. In an embodiment, movement may equate to the straight line distance (or an estimate of the straight line distance) between a previous and new target location. In some embodiments, the batch report movement parameter may be optional and when omitted may indicate that target movement is not a factor in determining batch reporting.

The batch report on change of serving network parameter may indicate when present that a batch report should be sent by a target each time that a target changes from one cellular serving network to another cellular serving network. In an embodiment, a change of serving network to or from a WLAN network (e.g. a network providing WiFi or Bluetooth access but not cellular access) may not be counted as a change of serving network but a change from a first cellular network to a second cellular network with some WLAN access in between accessing the first and second cellular networks may be counted as a change of serving network.

The batch access network restriction parameter may provide restrictions on batch reporting associated with the access network via which batch reports would be sent to a data server by a target. In some embodiments, the batch access network restriction parameter may be encoded as a bit string with each type of access network represented by a different bit. A bit may be set to one to indicate that batch reporting is not allowed via the corresponding access network. A bit may be set to zero or may be omitted to indicate that batch reporting is allowed via the corresponding access network. One bit (e.g. which may be referred to as a user specified bit) may indicate whether the user of a target may be allowed to define allowed and/or disallowed access networks that, in the case of a conflict, would override any other preferences included in the batch access network restriction parameter. In some embodiments, the batch access network restriction parameter may be optional and if not included may indicate that any access network may be used for batch reporting.

The batch storage overflow parameter may indicate whether a target should send or not send a batch report when storage for crowdsourcing measurements would otherwise overflow. The batch storage overflow parameter may also indicate whether the target shall discard new measurements or the oldest measurements when storage overflow does occur due to a target not being triggered to send a batch report or not being able to send a batch report. In some embodiments, the batch storage overflow parameter may be optional and if omitted may indicate that a target may employ an implementation specific preference for managing storage overflow.

In some embodiments, duration trigger parameters may comprise one or more of the following parameters: a crowdsourcing start time parameter and a crowdsourcing duration parameter. These duration trigger parameters are described herein next for some example embodiments.

The crowdsourcing start time parameter may indicate when crowdsourcing shall begin at a target relative to the time of receipt of a crowdsourcing request from a control server (e.g. in units of 15 minutes). In some embodiments, the crowdsourcing start time parameter may be optional and if omitted may indicate a start time at the current time.

The crowdsourcing duration parameter may provide the overall duration of crowdsourcing (e.g. in units of 15 minutes). In some embodiments, the crowdsourcing duration parameter may be optional and if not included may indicate an unlimited duration.

Crowdsourcing Measurement Parameters

As previously described herein, a request for crowdsourcing (e.g. as in step 1 of FIG. 2), a confirmation of crowdsourcing (e.g. as in step 2 in FIG. 2) and a response to a query for crowdsourcing (e.g. as in step 8 in FIG. 2) may each include measurement parameters that indicate the types of measurements and other information that a target will obtain and report to a data server. In the case of advanced crowdsourcing, each measurement type indicated by the measurement parameters may correspond to measurements for a specific access type and may further specify the measurements that a target should obtain for this access type. In an embodiment, the access types that be indicated may comprise: WiFi, LTE, WCDMA, GSM and Short Range Node (SRN). In addition, measurement parameters may indicate a measurement type that corresponds to crowdsourcing of sensor measurements. Measurement parameters may further include a frequency parameter for each indicated measurement type. Specific measurement parameters for advanced crowdsourcing are described herein next for some example embodiments.

A frequency parameter may be included for each measurement type that is requested for advanced crowdsourcing that defines for which measurement sets the measurement type should be obtained by a target. In an embodiment, the frequency parameter comprises an integer N (where N≥1) that indicates that measurements shall only be obtained by a target for the corresponding measurement type for measurement sets N, 2N, 3N, 4N etc. where measurement set 1 is the first measurement set triggered at a target for a particular crowdsourcing session, measurement set 2 is the second set, measurement set 3 is the third set etc. A frequency value N of more than one may allow measurements to be reduced for the corresponding measurement type by skipping measurement sets. For example with N=3 indicated for a measurement type corresponding to LTE access, a target would only obtain measurements associated with LTE access in every third measurement set (e.g. would obtain LTE measurements only in measurement sets 3, 6, 9, 12 etc.). Use of a frequency N1 for one type of measurement and a frequency of N2 for another type of measurement where N1 and N2 are coprime may also minimize the number of measurement sets for which both measurement types are obtained and thereby reduce the overall size of individual measurement sets. The frequency parameter may be used to reduce resource usage for sending and receiving crowdsourcing measurements. In some embodiments, the frequency parameter may be optional and may have a default value of one when not included. In an embodiment, when all measurements for a particular measurement set are skipped due to the frequency parameter, the measurement set may not be obtained and no information regarding the measurement set may be provided to the data server by a target.

A WLAN AP measurements parameter may be included in the measurement parameters for advanced crowdsourcing to define requested or confirmed WLAN AP related measurements for WiFi access that a target will obtain for crowdsourcing. In some embodiments, requested or confirmed WLAN AP measurements may be defined using a bit string with one bit corresponding to each type of measurement. A bit setting of one may indicate that a measurement is requested by a server or confirmed by a target and a bit setting of zero or omission of a bit may indicate that a measurement is not requested or not confirmed. In an embodiment, WLAN AP measurements that may each be requested and confirmed separately from one another may comprise static WLAN AP measurements that rarely change and dynamic WLAN AP measurements that are typically different at different locations of a target. Both static and dynamic WLAN AP measurements may be measurements or other information obtained by a target for one or more WiFi APs. Static WLAN AP measurements may be obtained and reported by a target infrequently and may comprise: an AP service set identification (SSID), an AP operating class, an AP device type (e.g. indicating the IEEE 802.11 versions that are supported by an AP), a location of an AP reported by the AP, an estimated location for an AP obtained by a target, an AP channel, an AP antenna gain and an AP transmit power. Dynamic AP measurements may be obtained and reported by a target frequently (e.g. for each measurement set that is triggered for WLAN AP measurements) and may comprise: an AP signal to noise ratio, an AP signal strength, an AP RTD, a target transmit power, a target signal to noise ratio as measured by an AP, a target signal strength as measured by an AP.

Similarly to the WLAN AP measurements parameter, other parameters may be included in the measurement parameters for advanced crowdsourcing to define other types of requested or confirmed measurements. In some embodiments, these other parameters may comprise an LTE measurements parameter, an UTRA (Universal Mobile Telecommunications System (UMTS) Terrestrial Radio Access) measurements parameter, a GSM measurements parameter, an SRN measurements parameter and a sensor measurements parameter. These parameters may indicate measurements that are requested or confirmed for LTE networks, UTRA (or WCDMA) networks, GSM networks, SRN APs (e.g. Bluetooth or NFC APs) and sensors on the target, respectively. In these embodiments, each of these measurements parameters may indicate requested or confirmed measurements using a bit string with one bit corresponding to each type of measurement. A bit setting of one may indicate that a measurement is requested by a server or confirmed by a target and a bit setting of zero or omission of a bit may indicate that a measurement is not requested or not confirmed. In some embodiments, and similar to WLAN AP measurements, measurements that may each be requested and confirmed separately from one another may comprise static measurements that rarely change and dynamic measurements that are typically different at different locations of a target. In an embodiment, static LTE measurements may comprise an Absolute Radio Frequency Channel Number (ARFCN) for an LTE cell and a location for an LTE eNodeB estimated by a target. In an embodiment, dynamic LTE measurements may comprise an indication of whether an LTE cell is a primary serving cell for a target, a reference signal received power (RSRP) for an LTE cell, a reference signal received quality (RSRQ) for an LTE cell and a target receive minus transmit (Rx-Tx) time difference measurement for an LTE cell. In an embodiment, static UTRA measurements may comprise a UTRA ARFCN for a UTRA cell, a physical ID for a UTRA cell and a location for a UTRA Node B estimated by a target. In an embodiment, dynamic UTRA measurements may comprise (i) a carrier RSSI for a UTRA cell, (ii) an indication of whether a UTRA cell is a serving cell for a target, (iii) measurements for a frequency-division duplexing (FDD) UTRA cell comprising an S/N ratio (e.g. denoted CPICH Ec/N0), Received Signal Code power (RSCP) and FDD path loss and (iv) measurements for a time-division multiplexing (TDD) UTRA cell comprising an RSCP, a TDD path loss and a target timing advance. In an embodiment, static GSM measurements may comprise a location for a GSM BS estimated by a target. In an embodiment, dynamic GSM measurements may comprise an indication of whether a GSM cell is a serving cell for a target, a received signal level for a GSM cell and a timing advance for a target. In an embodiment, static SRN measurements may comprise a location for an SRN AP reported by the AP and a location for an SRN AP estimated by a target. In an embodiment, dynamic SRN measurements may comprise an RSSI for an SRN AP and an RTD for an SRN AP. In an embodiment, static sensor measurements may not be defined. In an embodiment, dynamic sensor measurements may comprise a motion state for a target, a barometric pressure, a temperature, a humidity, a sound level and an illuminance.

In the case of the SRN measurements parameter, an additional SRN categories parameter may be included that may define the SRN technologies and/or SRN vendors for which SRN measurements are requested by a server or confirmed by a target. In that case, the separate static SRN measurements and separate dynamic SRN measurements may be requested or confirmed (e.g. using separate bit strings) for each combination of SRN technology and SRN vendor for which measurements are requested or confirmed.

The names, abbreviations and terms used herein previously to identify particular crowdsourcing measurements (e.g. for measurements related to a WLAN AP, LTE, UTRA, GSM, SRN and sensors) are well known in the art (e.g. are defined in publicly available TSs from 3GPP and OMA) and hence will be understood by those familiar with the art.

Crowdsourcing Reported Measurements

In some embodiments, measurement related data that is reported by a target to a data server for crowdsourcing (e.g. at steps 3 and 4 in FIG. 2) may comprise at least one of the following parameters: a crowdsourcing common data parameter, a sequence number parameter, a basic measurements parameter and an advanced measurements parameter.

A crowdsourcing common data parameter may be used to provide data that is common to all basic or all advanced crowdsourcing measurements that are reported by a target either for one measurement report (e.g. one instance of steps 3 and 4 in FIG. 2) or throughout an entire crowdsourcing session (e.g. from the time that crowdsourcing starts at a target until crowdsourcing is terminated at the target). A crowdsourcing common data parameter may provide information to a data server concerning the target itself which may enable a data server to infer the reliability and accuracy of the provided measurements and/or to recalibrate certain provided measurements based on known characteristics of the target device that may be configured in the data server (e.g. characteristics related to a particular vendor, model and/or version of a target device). In an embodiment in which LPP/LPPe is used, a crowdsourcing common data parameter may be included in and only in the first or only LPP/LPPe Provide Location Information that is sent as part of a single LPP transaction to provide crowdsourcing measurements to a data server.

In some embodiments, a crowdsourcing common data parameter may comprise at least one of a device type parameter, a report number parameter and a last reporting time parameter. A device type parameter may identify an Original Equipment Manufacturer (OEM) vendor and optionally an OEM model and version for the target device (e.g. the OEM manufacturer of the target device). A device type identifier may also identify the vendor, model and version for each wireless baseband chip in the target device. A report number parameter may provide a crowdsourcing report number which, in some embodiments, may start at one for the first crowdsourcing measurement report (e.g. the first instance of sending measurements to a data server according to steps 3 and 4 in FIG. 2) and may increase by one for each successive measurement report. In some embodiments the report number parameter may be omitted for anonymous crowdsourcing to help protect user privacy. The last reporting time parameter may provide the time when the last crowdsourcing measurement report was sent by the target to the data server. This may be used by the data server to compile statistics on the frequency of crowdsourcing reporting by a particular target or by all targets. In some embodiments, this parameter may be omitted for anonymous crowdsourcing to help protect user privacy.

A sequence number parameter may be included in each crowdsourcing message when a measurement report comprises more than one message (e.g. when more than one LPP/LPPe Provide Location Information message is sent in steps 3 and 4 in FIG. 2). The sequence number parameter may provide a sequence number for each separate message (e.g. for each LPP/LPPe Provide Location Information message sent as part of the same LPP transaction to report crowdsourcing measurements when LPP/LPPe is used). In an embodiment, the sequence number starts at zero and is incremented by one modulo 256 in each succeeding message. A data server may use the sequence number parameter to detect message loss and/or message duplication.

The basic measurements parameter may provide certain data for a basic crowdsourcing measurement subset and in an embodiment may comprise a basic measurements subset parameter (described later herein). The basic measurements themselves for a basic crowdsourcing measurement subset may be provided separately. For example, when LPP/LPPe is used to convey crowdsourcing measurements as described in association with FIGS. 2 and 3A-3B, basic crowdsourcing measurements for one measurement subset may be conveyed in separate LPP and LPPe position method containers within one LPP/LPPe message in the same way as measurements for target positioning. In this case, each LPP/LPPe Provide Location Information message may be restricted to providing just one subset of measurements which may be part of or all of one measurement set (e.g. as instigated at one particular time by measurement trigger parameters).

The advanced measurements parameter may provide one or more measurement subsets for advanced crowdsourcing. In some embodiments, the advanced measurements parameter may comprise one or more of an advanced measurements subsets parameter, a WLAN AP measurements parameter, an LTE measurements parameter, a UTRA measurements parameter, a GSM measurements parameter, an SRN measurements parameter and a sensor measurements parameter.

The advanced measurements subsets parameter may comprise some number (e.g. between 1 and 512) of crowdsourcing measurement subset parameters. The crowdsourcing measurement subset parameters may refer to successive measurement subsets that are being reported by a target in the same measurement report for advanced crowdsourcing, where each crowdsourcing measurement subset parameter contains measurement related data for a single measurement subset. These measurement subsets may belong either to the same measurement set (comprising measurements obtained due to one measurement parameters trigger event) or to more than one measurement set. The measurement subsets may be included and referenced in a measurement report in the order in which they were obtained and may be indexed from 1 for the first subset to N (e.g. N≤512) for the last subset where the index for any measurement subset, referred to herein as a "measurement subset index", may corresponds to its position in the measurement report. A basic measurements subset parameter (referred to earlier herein) may comprise one crowdsourcing measurement subset parameter which in an embodiment may contain the same parameters and be encoded in the same way as the crowdsourcing measurement subset parameter used for advanced crowdsourcing.

The crowdsourcing measurement subset parameter may provide common information for one measurement subset that is being reported by a target and may be used for both advanced crowdsourcing and basic crowdsourcing as described earlier herein. In an embodiment, the crowdsourcing measurement subset parameter may comprise a measurement location parameter, a measurement time parameter, an end of measurement set parameter and an anchor point parameter.

The measurement location parameter may provide an absolute location and/or a relative location for the target at the time the measurements reported for the corresponding measurement subset were obtained. An absolute location may include latitude, longitude and possibly altitude or may refer to a location using a map or some coordinate system known to the data server. A relative location may provide the target location relative to a previous target location (whether known or unknown) for a previous measurement subset (e.g. the most recent measurement subset marked as an anchor point or an immediately preceding measurement subset if no anchor points were defined). The previous target location may coincide with an absolute and/or a relative location that was provided for the previous measurement subset that is being referenced. The source of an absolute location and the source of a relative location may be provided in some embodiments. The source of a location may refer to the positioning method or positioning methods (e.g. such as GNSS, Assisted GNSS, OTDOA, WiFi, sensors) used by a target to obtain the location.

The measurement time parameter may provide an absolute time or a relative time at which the measurements reported for the corresponding measurement subset were obtained. Absolute time may be based on a global time system—e.g. Coordinated Universal Time (UTC). Relative time may provide the time (e.g. in seconds) at which measurements in the corresponding measurement subset were obtained relative to the time at which the previous measurement subset was obtained. The measurement time parameter may also provide the duration of the corresponding measurement subset. In an embodiment, the duration may be measured from the time of the first measurement in the measurement subset to the time the last measurement in the measurement subset was obtained. The measurement time parameter may further include a location time which may provide the time at which an absolute location and/or a relative location was/were obtained for the corresponding measurement subset relative to the start of (e.g. first measurement for) the measurement subset.

An end of measurement set parameter may be included to indicate the end of a measurement set and may enable different measurement sets that are included in the same measurement report to be distinguished and may enable the measurement subsets that belong to each measurement set to be identified. In some embodiments, a new measurement set may be assumed by a data server to begin in the first measurement subset reported by a target as part of a new measurement report (e.g. as part of a new LPP transaction conveying measurements in the case that LPP/LPPe is used) and a measurement set may be assumed to end by a data server in the last measurement subset reported by a target as part of one measurement report (e.g. as part of one LPP transaction when LPP/LPPe is used).

An anchor point parameter may indicate that the target location for the corresponding measurement subset may be used as an anchor point—e.g. may be used to define a relative target location for one or more subsequent measurement subsets. In some embodiments, even if the absolute target location for an anchor point is unknown, target locations relative to the anchor point may still be usefully provided to enable a data server to infer some information about the transmitters being reported such as their locations relative to one another.

The WLAN AP measurements parameter may provide advanced crowdsourcing measurements for WLAN APs for one or more measurement subsets. The measurement subsets for which WLAN AP measurements are provided may be identified using the measurement subset index referred to herein earlier. The WLAN AP measurements that are provided may comprise one or more of the WLAN AP measurements described herein earlier in association with the measurement parameters.

Similarly to the WLAN AP measurements parameter, the LTE measurements parameter, UTRA measurements parameter, GSM measurements parameter, SRN measurements parameter and sensor measurements parameter may each provide advanced crowdsourcing measurements for LTE cells, UTRA cells, GSM cells, SRN APs and sensors on a target, respectively, for one or more measurement subsets each. The measurement subsets for which measurements are provided by each of these measurements parameters may be identified using the measurement subset index referred to herein earlier. The LTE, UTRA, GSM, SRN and sensor measurements that are provided may further comprise one or more of the measurements described for each of these measurement types herein earlier in association with the measurement parameters.

It should be noted that for all reported measurement types (e.g. WLAN AP, LTE, WCDMA, GSM and SRN), an indication of the cell, BS, AP and/or Femtocell to which each measurement applies may be provided as part of each measurement subset and/or measurement set. For example, in the case of LTE, WCDMA and GSM, the global identity of a cell (e.g. LTE cell, WCDMA cell or GSM cell) may be provided. In the case of WLAN AP or SRN measurements, the identity of an AP may be provided—e.g. using a Media Access Control (MAC) address.

Figure 4:
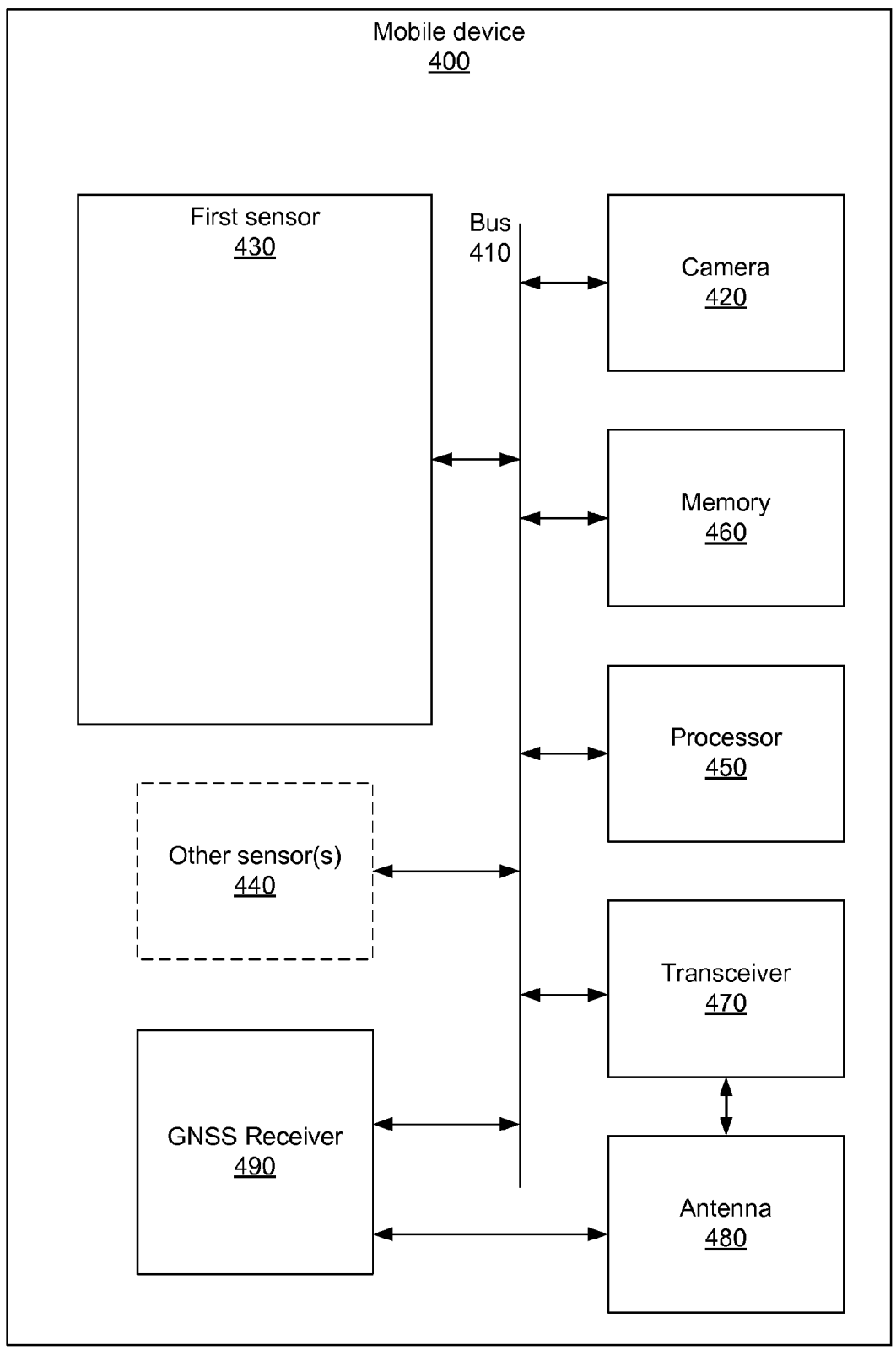
FIGS. 4-5 show a mobile device and a server, respectively, in accordance with some example embodiments.
Figure 5:
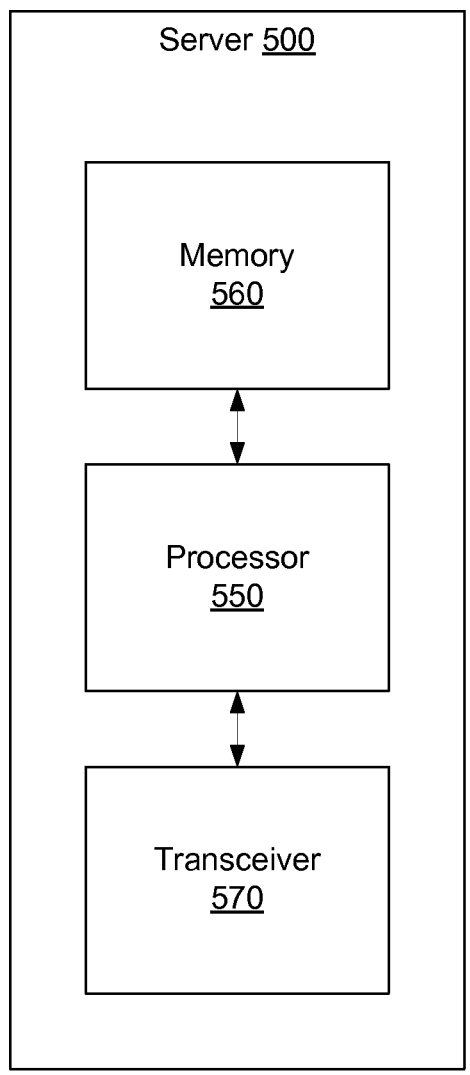

FIGS. 4-5 show a mobile device and a server, respectively, in accordance with some example embodiments.

In FIG. 4, a mobile device 400 is exemplified. Mobile device 400 may correspond to or represent one or more of mobile devices 150 in FIG. 1 and/or mobile device 220 in FIG. 2. Mobile device 400 may contain a bus 410, an optical camera 420, a first sensor 430, other optional sensor(s) 440 (as indicated with the dotted lines), a processor 450, and a GNSS receiver 490. The bus 410 couples together the camera 420, the first sensor 430, the optional sensors 440 and the GNSS receiver 490 to the processor 450. The first sensor 430 and/or the other sensor(s) 440 may include or comprise an accelerometer, a gyroscope, a light sensor, a magnetometer, a barometer, a hygrometer, a microphone, a compass, a thermometer and/or the like. First sensor 430 and other sensors 440 may enable or assist mobile device 400 to obtain its location (e.g. by enabling measurements of relative change in horizontal and/or vertical location) and may enable mobile device 400 to obtain sensor measurements for crowdsourcing. The mobile device 400 may also include a memory 460 and a transceiver 470 coupled to the bus 410 (as shown in FIG. 4) and/or to the processor 450 (not shown in FIG. 4). The memory 460 may include an operating system and code to perform embodiments described herein. The transceiver 470 may be coupled to an antenna 480 and may allow the mobile device 400 to transmit and receive signals to and from various BSs (e.g. BSs 130 in FIG. 1), various APs (e.g. APs 140 in FIG. 2) and to communicate with one or more servers such as one or more of servers 110 in FIG. 1 or server 500 described later herein for FIG. 5.

The transceiver 470 may further allow mobile device 400 to measure signals received from one or more BSs and APs (e.g. BSs and APs supporting LTE, WCDMA, GSM, WiFi and/or Bluetooth) in order to obtain crowdsourcing measurements to support the various techniques described herein. The transceiver 470 may also measure signals received from one or more BSs and/or APs to enable mobile device 400 or a separate location server (e.g. server 500) to obtain a location for mobile device 400. Transceiver 470 may also enable transmission of signals from mobile device 400 to other entities (e.g. APs and/or BSs) that may be measured by these other entities and used to provide information to mobile device 400 that may be included in, or used to help derive information for, crowdsourcing measurement reports.

Specifically, the transceiver 470 may include a receiver to receive a request from a second server, wherein the request comprises first control parameters and first measurement parameters, and a transmitter to return a response to the second server, wherein the response comprises second control parameters and second measurement parameters. The transmitter further returns a response to the second server, wherein the response comprises second control parameters and second measurement parameters. The transmitter further sends the measurements to the first server in a plurality of measurement reports at a second plurality of different times, wherein the second plurality of different times is based on the second control parameters. The processor 450 obtains a receiver to receive a request from a second server, wherein the request comprises first control parameters and first measurement parameters, and obtains measurements at a first plurality of different times, wherein the measurements are based on the second measurement parameters, and wherein the first plurality of different times is based on the second control parameters.

The first server may be a data server and the second server may be a control server. The first control parameters and the second control parameters may each comprise at least one of activation trigger parameters, measurement trigger parameters, reporting trigger parameters and duration trigger parameters. The plurality of measurement reports comprises a fixed anonymous value.

The receiver acts as a means to receive a request from a second server, wherein the request comprises first control parameters and first measurement parameters. The transmitter acts as a means to return a response to the second server, wherein the response comprises second control parameters and second measurement parameters. The processor acts as a means to obtain measurements at a first plurality of different times, wherein the measurements are based on the second measurement parameters, and wherein the first plurality of different times is based on the second control parameters. The transmitter further acts as a means to send the measurements to the first server in a plurality of measurement reports at a second plurality of different times, wherein the second plurality of different times is based on the second control parameters.

The GNSS receiver 490 may be coupled to antenna 480 or to a separate antenna not shown in FIG. 4 and may receive and measure signals from GNSS SVs (e.g. SVs for GPS, Galileo or GLONASS) to enable a location of mobile device 400 to be obtained—e.g. according to code executed by processor 450. In some embodiments, any location of mobile device 400 obtained by mobile device 400 (e.g. from GNSS measurements or measurement of nearby APs and/or BSs) may be included within crowdsourcing measurement related data sent to a data server as described elsewhere herein. Software or firmware instructions stored in memory 460 may be executed by processor 450 and enable mobile device 400 to perform the various procedures and techniques described herein.

In FIG. 5, a server 500 which may be a data server, a control server or a control/data server is exemplified. Server 500 may represent or correspond to any of servers 110 in FIG. 1 and either or both of servers 230 and 240 in FIG. 2. Server 500 includes a processor 550, memory 560 and a transceiver 570. The memory 560 may include an operating system and code which may be executed by processor 550 to perform embodiments described herein. The transceiver 570 allows the server 500 to communicate with one or more mobile devices such as mobile device 400. The communication may be via one or more networks such as networks 120 in FIG. 1 to least one of which server 500 may be connected.

For example, a server, for obtaining crowdsourcing measurements from a mobile device, comprises a transceiver 570 including a receiver and a transmitter. The transmitter sends a request to the mobile device, wherein the request comprises first control parameters and first measurement parameters. The receiver receive a response from the mobile device, wherein the response comprises second control parameters and second measurement parameters, and receives measurements from the mobile device in a plurality of measurement reports, wherein the measurements are obtained by the mobile device at a first plurality of different times based on the second control parameters, and wherein the measurements are sent by the mobile device at a second plurality of different times determined by the second control parameters.

The transmitter acts as a means to send a request to the mobile device, wherein the request comprises first control parameters and first measurement parameters. The receiver acts as a means to receive a response from the mobile device, wherein the response comprises second control parameters and second measurement parameters, and to receive measurements from the mobile device in a plurality of measurement reports, wherein the measurements are obtained by the mobile device at a first plurality of different times based on the second control parameters, and wherein the measurements are sent by the mobile device at a second plurality of different times determined by the second control parameters.

FIGS. 6-13 show procedures in a mobile device and a server, in accordance with some example embodiments.

Figure 6:
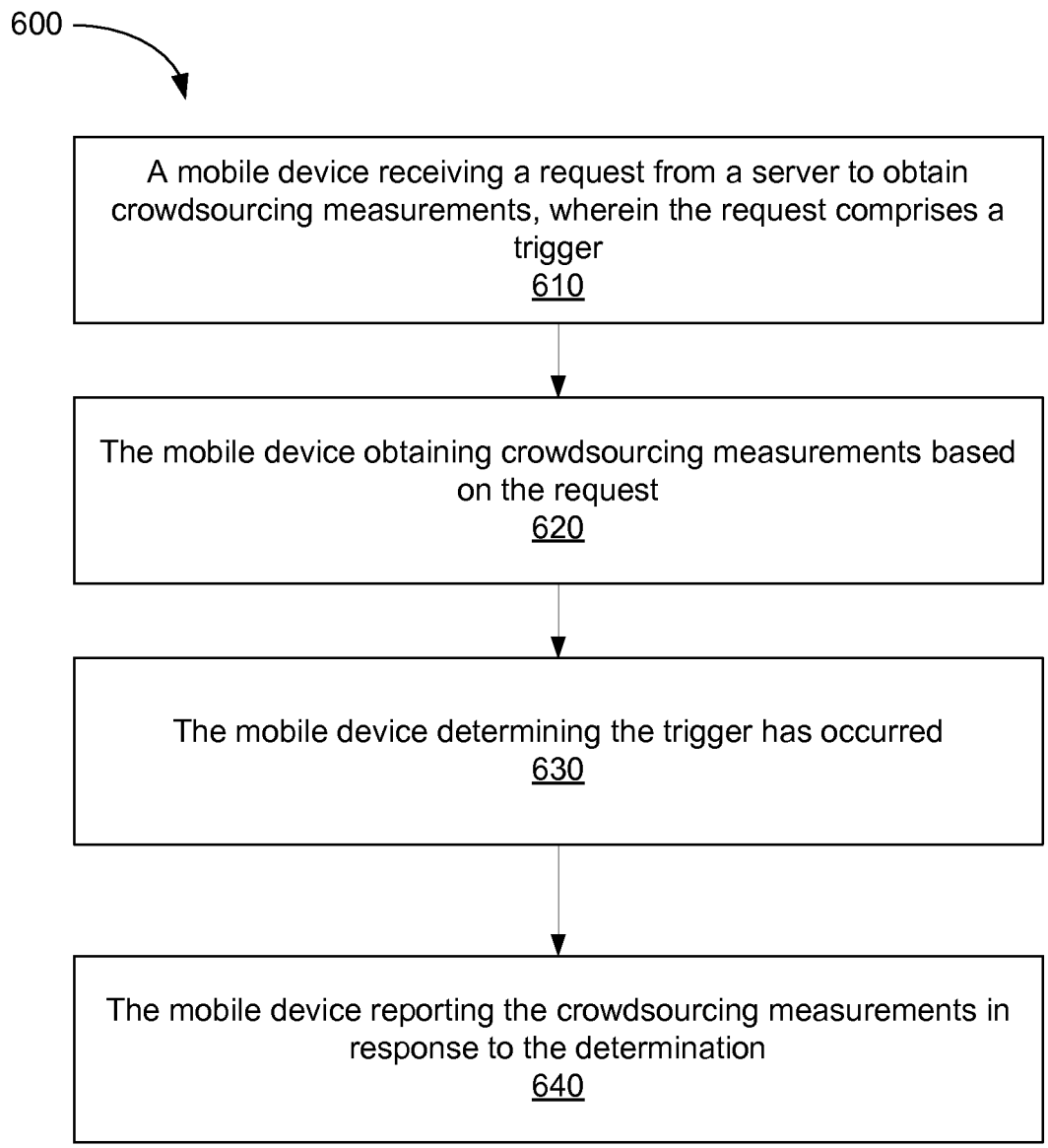
FIGS. 6-13 show example embodiments of procedures applicable to control of crowdsourcing at a mobile device and a server.

FIG. 6 shows a procedure 600 in a mobile device such as a mobile device 150 in FIG. 1, mobile device 220 in FIG. 2 and mobile device 400 in FIG. 4. At 610, the mobile device receives a request from a server to obtain crowdsourcing measurements, wherein the request comprises a trigger. The trigger may be part of or comprise reporting trigger parameters. As described above in association with FIG. 2, a server may initiate a control transaction with the mobile device. The server may be a control server 110 or a control/data server. At 620, the mobile device obtains crowdsourcing measurements based on the request. At 630, the mobile device determines the trigger has occurred. At 640, the mobile device reports the crowdsourcing measurements in response to the determination. The mobile device may initiate a data transaction, for example, by sending an LPP/LPPe Provide Location Information message to a server containing the crowdsourcing measurements. The server may be a data server 110 or a control/data server.

Figure 7:
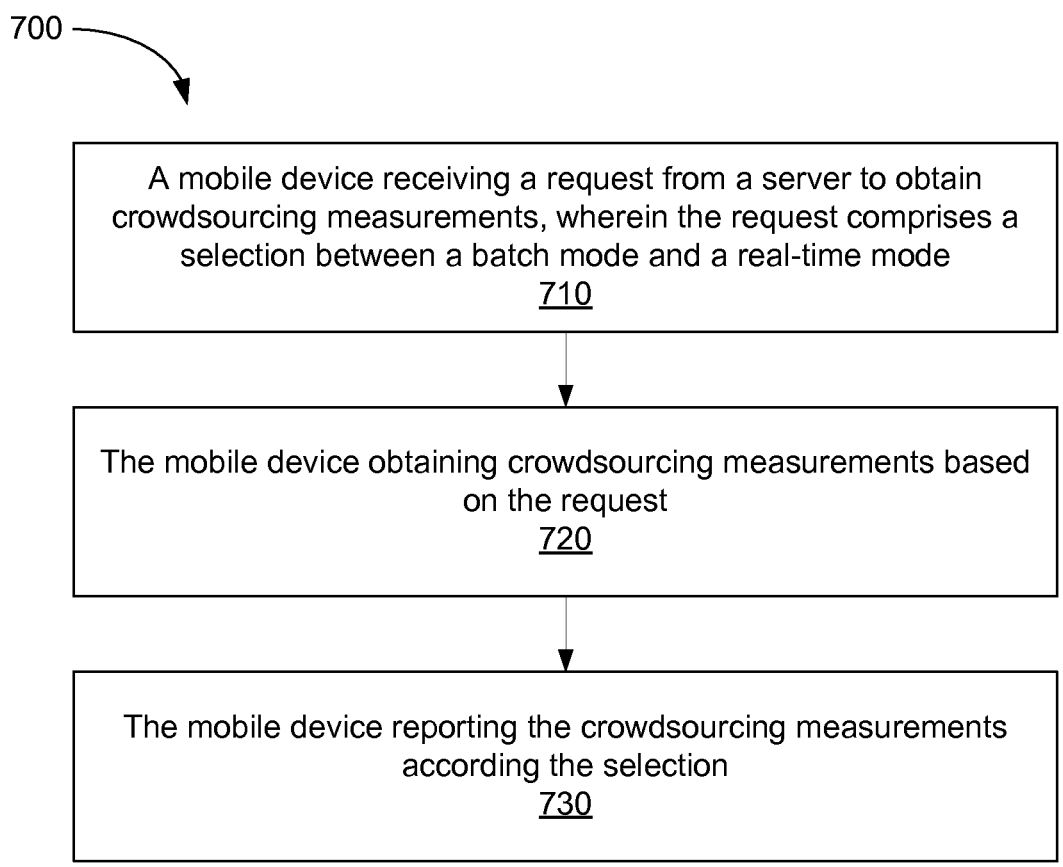

FIG. 7 shows a method 700 in a mobile device such as a mobile device 150 in FIG. 1, mobile device 220 in FIG. 2 and mobile device 400 in FIG. 4. At 710, a server initiates a control transaction with the mobile device. The mobile device receives a request from the server to obtain crowdsourcing measurements, wherein the request comprises a selection between a batch mode and a real-time mode. The server may be a control server 110 or a control/data server. The request for crowdsourcing measurements may include a transaction ID, a session ID, a crowdsourcing request, and measurement parameters and control parameters, for example, in an LPP/LPPe Request Location Information message as in step 1 of FIG. 2. To complete the control transaction, the mobile device may return a response including an end transaction ID, a session ID S, a crowdsourcing confirmation, and measurement parameters and control parameters, for example, in an LPP/LPPe Provide Location Information message as at step 2 of FIG. 2.

At 720, the mobile device obtains crowdsourcing measurements based on the request received in 710. At 730, the mobile device initiates a data transaction, for example, by sending an LPP/LPPe Provide Location Information message as at step 3 in FIG. 2 to a server. If additional crowdsourcing message are ready to be sent, additional LPP/LPPe Provide Location Information messages may be sent, as at step 3 in FIG. 2, and may each include a transaction ID, a session ID, crowdsourcing data, and measurements. The final or only crowdsourcing message sent at 720 may be an LPP/LPPe Provide Location Information message as at step 4 in FIG. 2 and may include an end transaction ID, a session ID, crowdsourcing data, and measurements. The server may be a data server 110 or a control/data server.

Figure 8:
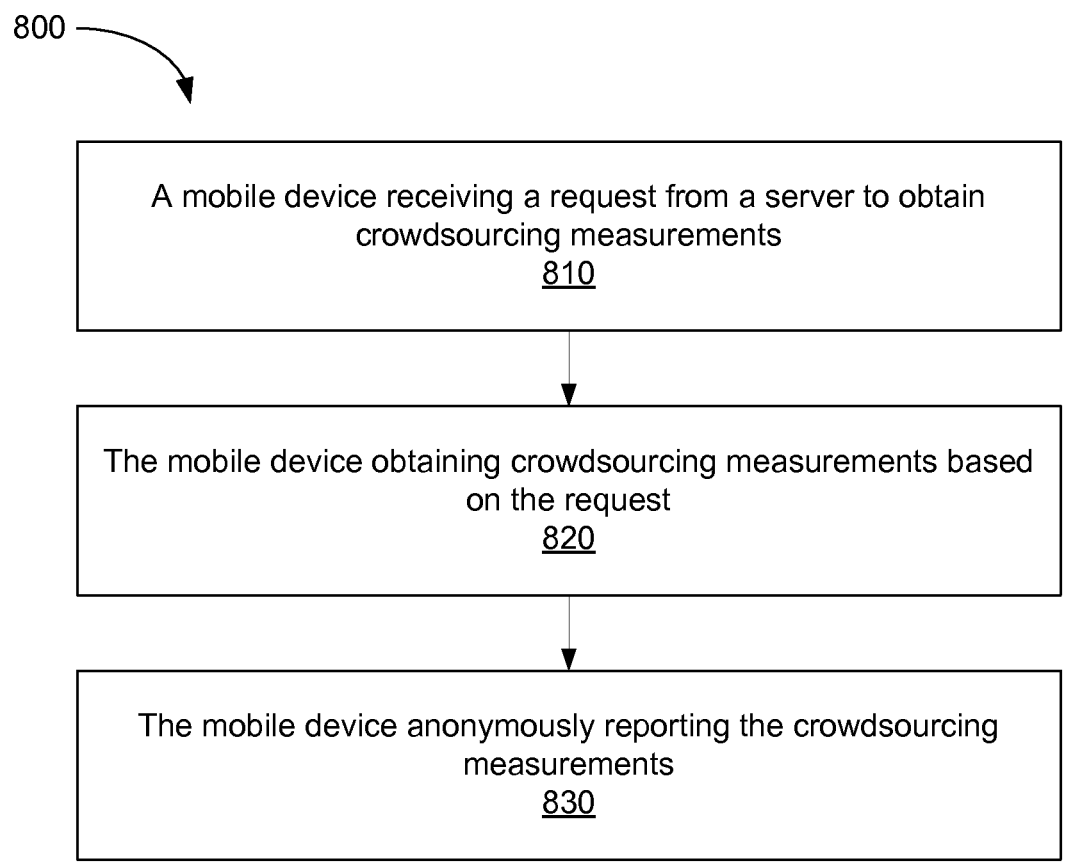

FIG. 8 shows a method 800 in a mobile device such as a mobile device 150 in FIG. 1, mobile device 220 in FIG. 2 and mobile device 400 in FIG. 4. At 810, the mobile device receives a request from a server to obtain crowdsourcing measurements. As described above, a server may initiate a control transaction with the mobile device. At 820, the mobile device obtains crowdsourcing measurements based on the request. At 830, the mobile device anonymously reports the crowdsourcing measurements, for example, by sending one or more LPP/LPPe Provide Location Information messages to a server, as described above. Each of the LPP/LPPe Provide Location Information messages sent at 830 may include a session ID set to some fixed value such as zero to indicate anonymous reporting. The server may be a data server 110 or a control/data server.

Figure 9:
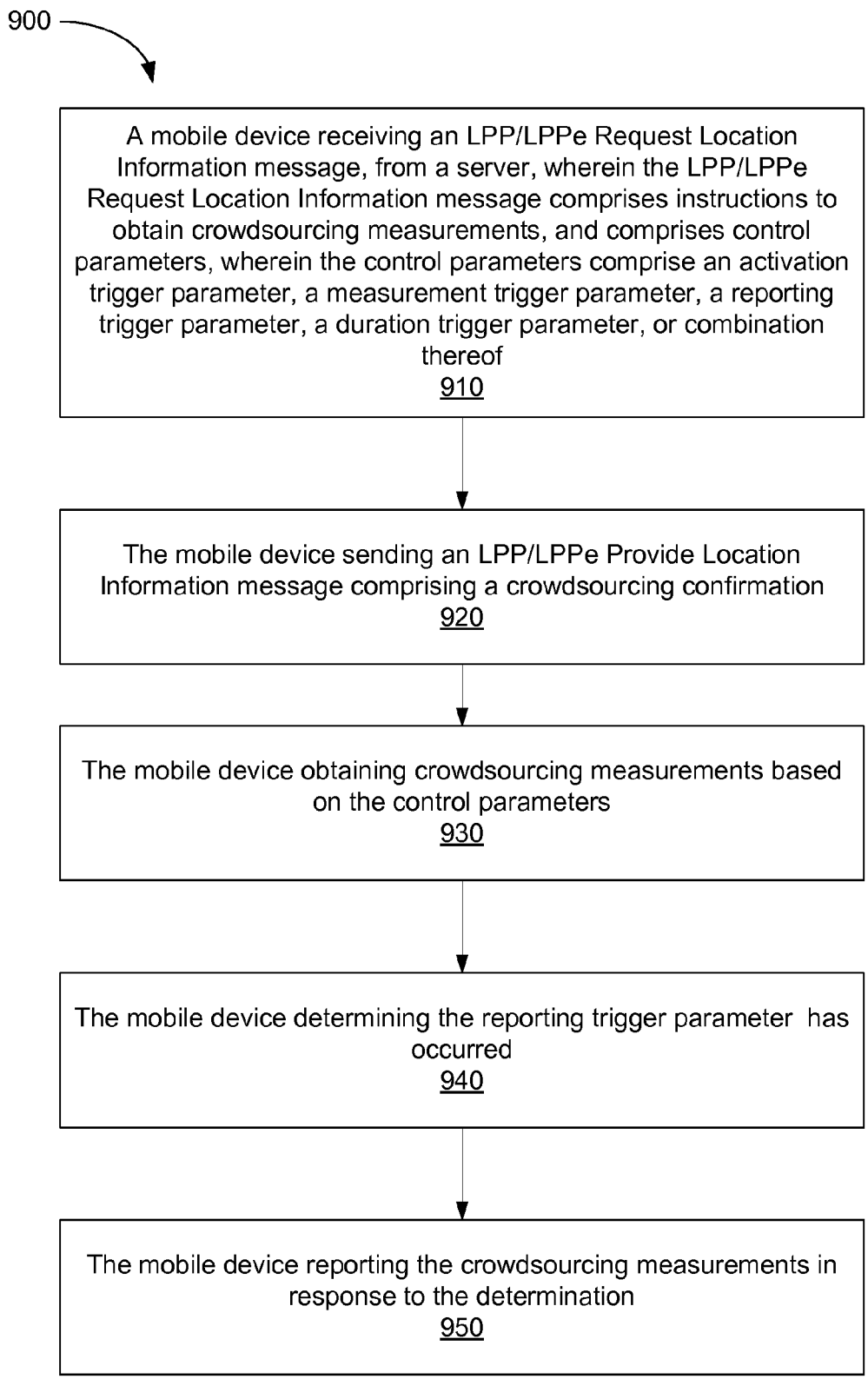

FIG. 9 shows a method 900 in a mobile device, such as a mobile device 150 in FIG. 1, mobile device 220 in FIG. 2 and mobile device 400 in FIG. 4, for reporting crowdsourcing measurements in response to receiving an LPP/LPPe Request Location Information message such as at step 1 in FIG. 2. At 910, the mobile device receives the LPP/LPPe Request Location Information message from a server, wherein the LPP/LPPe Request Location Information message comprises instructions to obtain crowdsourcing measurements, and comprises control parameters, wherein the control parameters comprise an activation trigger parameter, a measurement trigger parameter, a reporting trigger parameters, a duration trigger parameter, and/or some combination thereof.

At 920, the mobile device sends an LPP/LPPe Provide Location Information message the server comprising a crowdsourcing confirmation. At 930, the mobile device obtains crowdsourcing measurements based on the control parameters. At 940, the mobile device determines the reporting trigger parameter has occurred. At 950, the mobile device reports the crowdsourcing measurements in response to determining the reporting trigger parameter has occurred.

Figure 10:
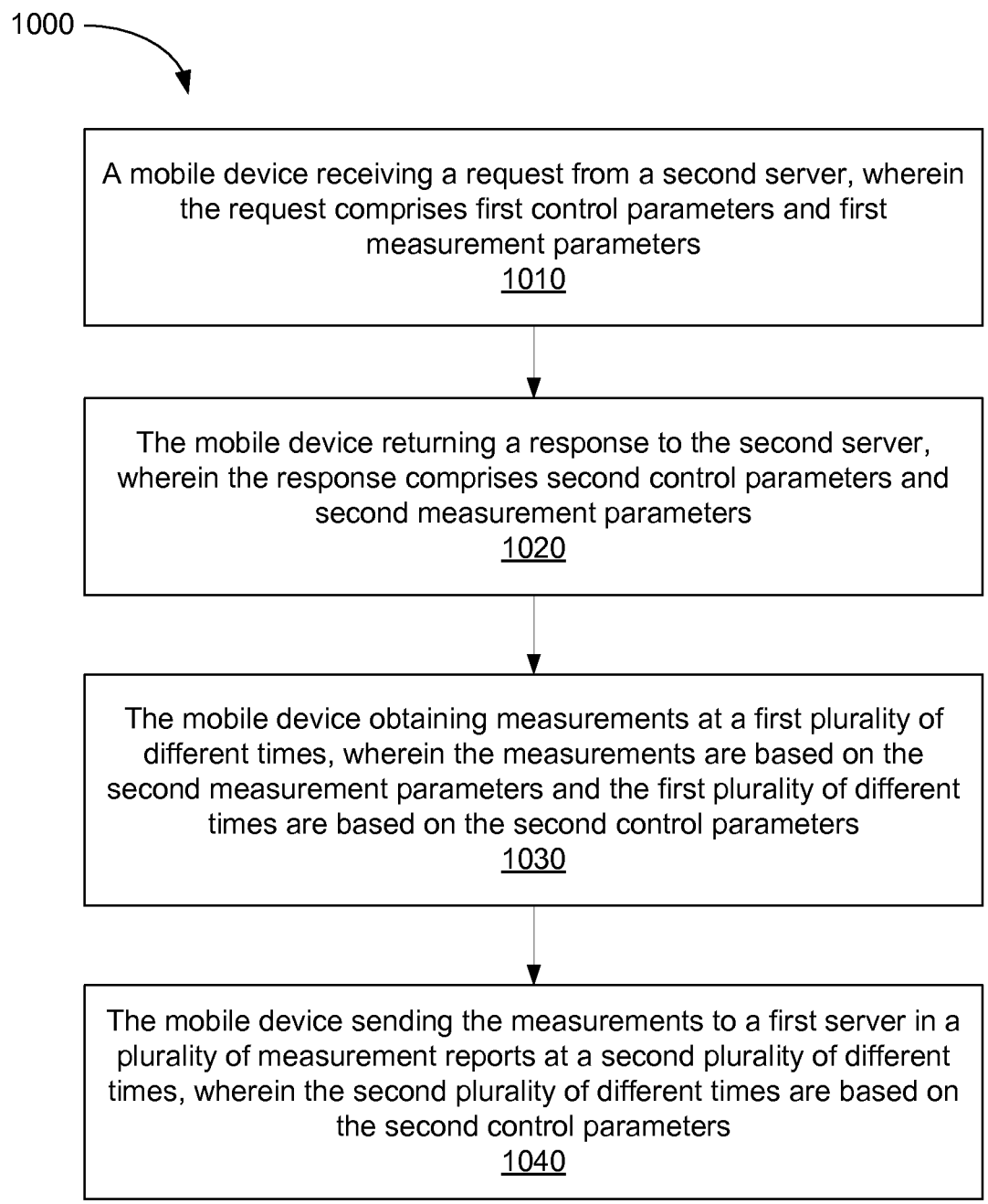

FIG. 10 shows a procedure 1000 in a mobile device for reporting crowdsourcing measurements to a first server. The mobile device may correspond to any of mobile device 150 in FIG. 1, mobile device 220 in FIG. 2 and mobile device 400 in FIG. 4. At 1010, the mobile device receives a request from a second server. The first server may be a data server and the second server may be a control server. The request comprises first control parameters and first measurement parameters. The request may correspond to the LPP/LPPe Request Location Information message for step 1 in FIG. 2.

At 1020, the mobile device returns a response to the second server. The response may correspond to the LPP/LPPe Provide Location Information message for step 2 in FIG. 2. The response comprises second control parameters and second measurement parameters. The second control parameters may be equivalent to (e.g. may be the same as) the first control parameters. The second measurement parameters may be equivalent to (e.g. may be the same as) or may be a subset of the first measurement parameters.

At 1030, the mobile device obtains measurements at a first plurality of different times. The measurements are based on the second measurement parameters. The first plurality of different times is based on the second control parameters.

At 1040, the mobile device sends the measurements to the first server in a plurality of measurement reports at a second plurality of different times, wherein the second plurality of different times is based on the second control parameters. The plurality of measurement reports may correspond to the LPP/LPPe Provide Location Information messages sent at steps 3 and 4 in FIG. 2.

In some embodiments, the first control parameters and the second control parameters may each comprise at least one of activation trigger parameters, measurement trigger parameters, reporting trigger parameters and duration trigger parameters. The activation trigger parameters may comprise conditions for activating and deactivating crowdsourcing at the mobile device, wherein the first plurality of different times may comprise times when crowdsourcing is activated. The activation trigger parameters may comprise at least one of a geographic area parameter, an activation area parameter, a deactivation area parameter, a country-network parameter, a detected transmitter parameter, a target motion state parameter, an environment parameter, a logical trigger combination parameter, an activation delay parameter and a deactivation delay parameter. The measurement trigger parameters may comprise conditions for obtaining measurements and the first plurality of different times may comprise times that are determined by the conditions—e.g. times when one or more measurement trigger parameters cause the mobile device to obtain crowdsourcing measurements.

The measurement trigger parameters may comprise at least one of a measurement periodicity parameter, a measurement movement parameter, a measurement floor change parameter, a measurement change of Serving Cell or AP parameter, and a logical measurement combination parameter. The reporting trigger parameters may comprise conditions for sending measurements to the first server and the second plurality of different times may comprise times that are determined by the conditions—e.g. times when one or more reporting trigger parameters cause the mobile device to report crowdsourcing measurements to the first server.

The reporting trigger parameters may comprise at least one of a real time parameter, a quasi-real time parameter and a batch parameter. In some embodiments, the real time parameter may be included in the reporting trigger parameters but not the quasi-real time parameter or the batch parameter, and the second plurality of different times may then be equivalent to (e.g. may be the same as or approximately the same as) either the first plurality of different times or a subset of the first plurality of different times. This equivalence or near equivalence of the first and second pluralities of different times may arise due to the mobile device reporting crowdsourcing measurements (or discarding crowdsourcing measurements if they cannot be sent) as soon as they are obtained due to the real time parameter, in which case measurement and reporting times will be the same or approximately the same.

In some embodiments, the quasi-real time parameter may be included in the reporting trigger parameters but not the real time parameter or the batch parameter. In this case, a subset of the second plurality of different times may be equivalent to (e.g. may be the same as or approximately the same as) a subset of the first plurality of different times. This subset relationship may arise due to the mobile device reporting a subset of crowdsourcing measurements as soon as they are obtained (in which case measurement and reporting times will be the same or approximately the same) and reporting other crowdsourcing measurements sometime after they are obtained (in which case measurement and reporting times will generally be different) due to the quasi-real time parameter.

In some embodiments, the batch parameter may be included in the reporting trigger parameters but not the real time parameter or the quasi-real time parameter. In these embodiments, the mobile device may store the measurements obtained at each of the first plurality of different times and send all measurements to the first server that are currently stored at each of the second plurality of different times, wherein each of the second plurality of different times may be based on the batch parameter. For example, each of the second plurality of different times may be triggered by one or more trigger conditions associated with the batch parameter. In some embodiments, the batch parameter may comprise at least one of a batch report movement parameter, a batch report on change of serving network parameter, a batch access network restriction parameter and a batch storage overflow parameter.

In some embodiments, the duration trigger parameters may comprise at least one of a crowdsourcing start time parameter and a crowdsourcing duration parameter.

The request at 1010, the response at 1020 and each measurement report at 1040 may comprise a session ID. The session ID in the response and in each measurement report may comprise a fixed anonymous value (e.g. a value of zero). The procedure 1000 may further comprise receiving a crowdsourcing query from one of the first server and the second server and returning a response to the one of the first server and the second server, wherein the response comprises the second control parameters and the second measurement parameters. In some embodiments, the crowdsourcing query may correspond to step 7 in FIG. 2 and the response to the query may correspond to step 8 in FIG. 2.

Figure 11:
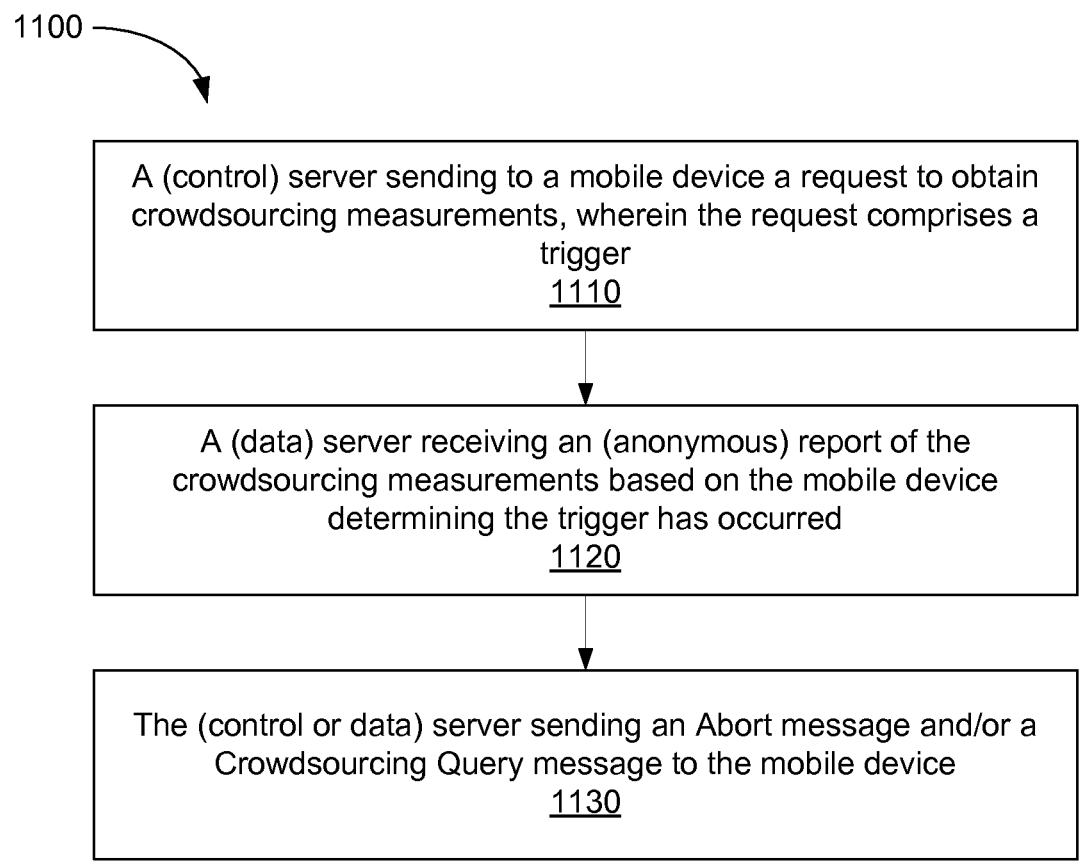

FIG. 11 shows a procedure 1100 at a server such as a server 110 in FIG. 1, server 230 or 240 in FIG. 2 and server 500 in FIG. 5. At 1110, the server, such as a control server, sends to a mobile device a request to obtain crowdsourcing measurements, wherein the request comprises a trigger. As an example, the trigger may comprise or be part of reporting trigger parameters. At 1120, a server, such as a data server or a control/data server, receives a report of the crowdsourcing measurements based of the mobile device determining the trigger has occurred. The report may be an anonymous report (e.g. may contain a session ID set to a fixed anonymous value such as zero) so that the identity of the mobile device is not revealed. At 1130, a server, such as the server in 1110 or the server in 1120, may send an Abort message and/or a Crowdsourcing Query message to the mobile device.

Figure 12:
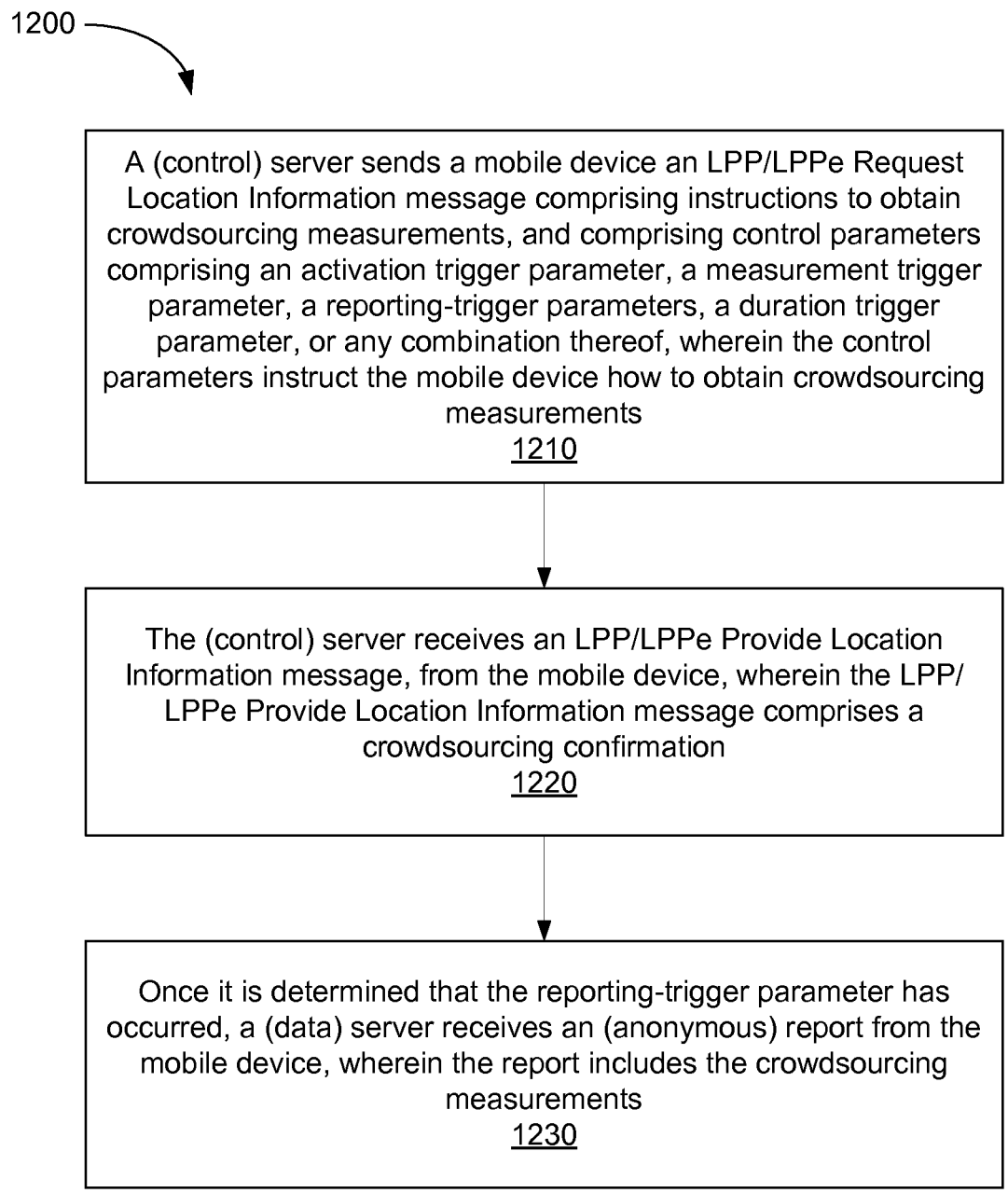

FIG. 12 shows a procedure 1200 in a server such as a server 110 in FIG. 1, server 230 or 240 in FIG. 2 and server 500 in FIG. 5. At 1210, the server, such as a control server, sends to a mobile device an LPP/LPPe Request Location Information message such as is sent at step 1 in FIG. 2. The LPP/LPPe Request Location Information message comprises instructions to obtain crowdsourcing measurements, and comprises control parameters. The control parameters comprise an activation trigger parameter, a measurement trigger parameter, a reporting-trigger parameters, a duration trigger parameter, or combination thereof. The control parameters instruct the mobile device how to obtain crowdsourcing measurements.

At 1220, the server receives an LPP/LPPe Provide Location Information message, from the mobile device such as is sent in step 2 in FIG. 2. The LPP/LPPe Provide Location Information message comprises a crowdsourcing confirmation. At 1230, after it is determined at the mobile device that a condition defined by the reporting-trigger parameter has occurred, a server (e.g. a data server), which may be the same as the server for 1210 and 1220 or may be a different server, receives a report from the mobile device such as is sent in step 3 or step 4 of FIG. 2. The report includes the crowdsourcing measurements. The report may be anonymous; that is may not include an identifier of the mobile device and may include a session ID set to some fixed value (e.g. zero).

Figure 13:
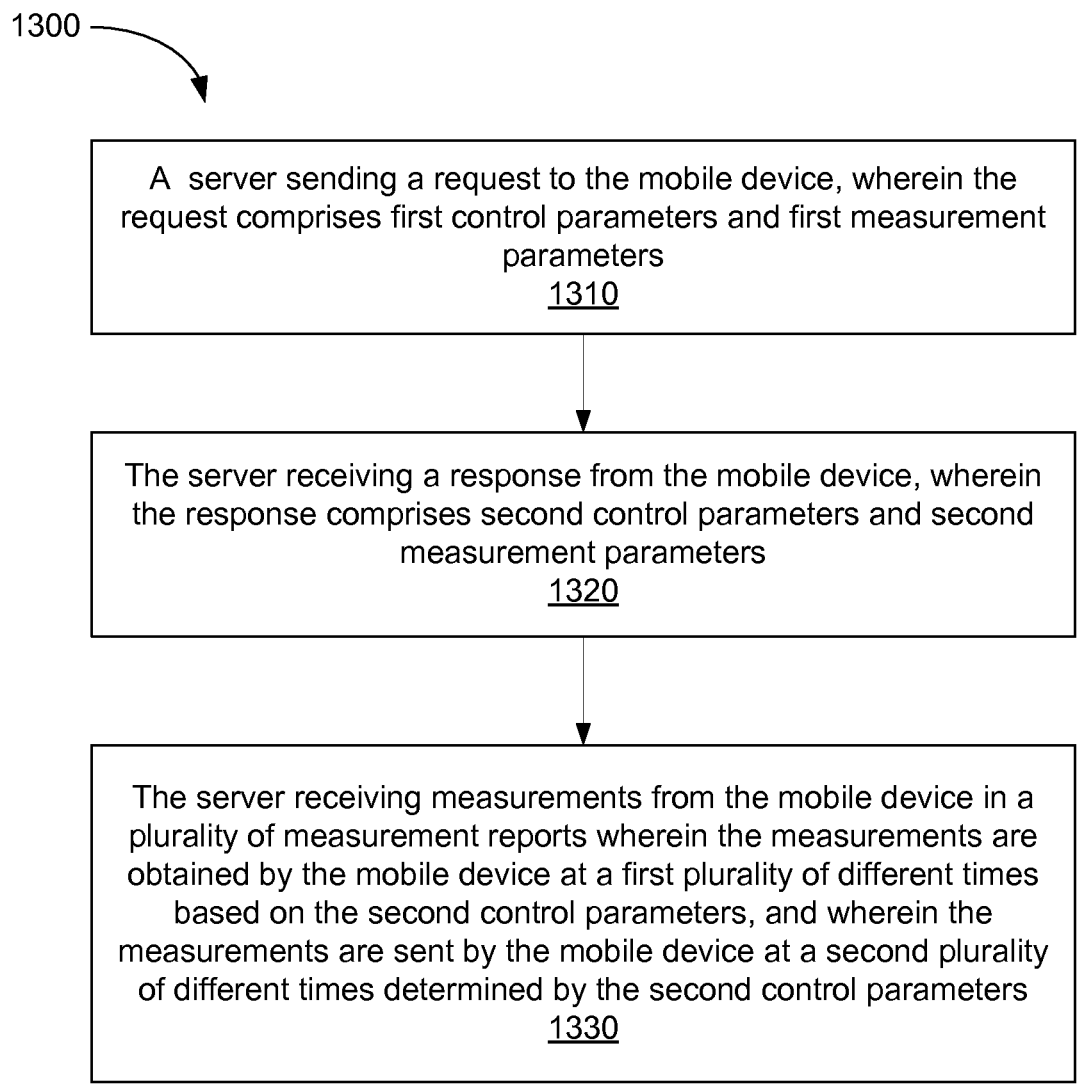

FIG. 13 shows a procedure 1300 in a server for obtaining crowdsourcing measurements from a mobile device. The server may correspond to a server 110 in FIG. 1, server 230 or 240 in FIG. 2 and server 500 in FIG. 5. In an embodiment, the server may be a control/data server such as server 110-N in FIG. 1. At 1310, the server sends a request to the mobile device. The request comprises first control parameters and first measurement parameters. In an embodiment, the request comprises an LPP/LPPe Request Location Information message such as that sent at step 1 in FIG. 2. At 1320, the server receives a response from the mobile device. The response comprises second control parameters and second measurement parameters. In an embodiment, the response comprises an LPP/LPPe Provide Location Information message such as that sent at step 2 in FIG. 2. At 1330, the server receives measurements from the mobile device in a plurality of measurement reports. The measurements are obtained by the mobile device at a first plurality of different times based on the second control parameters. The measurements are sent by the mobile device at a second plurality of different times determined by the second control parameters. In an embodiment, each measurement report comprises one or more LPP/LPPe Provide Location Information message such as those sent at steps 3 and 4 in FIG. 2

In some embodiments, the second control parameters may be equivalent to (e.g. may be the same as) the first control parameters. The second measurement parameters may be equivalent to (e.g. the same as) the first measurement parameters or a subset of the first measurement parameters. The first control parameters and the second control parameters may each comprise at least one of activation trigger parameters, measurement trigger parameters, reporting trigger parameters and duration trigger parameters. The activation trigger parameters may comprise conditions for activating and deactivating crowdsourcing at the mobile device, in which case the first plurality of different times may comprise times when crowdsourcing is activated.

The activation trigger parameters may comprise at least one of a geographic area parameter, an activation area parameter, a deactivation area parameter, a country-network parameter, a detected transmitters parameter, a target motion state parameter, an environment parameter, a logical trigger combination parameter, an activation delay parameter and a deactivation delay parameter.

The measurement trigger parameters may comprise conditions for obtaining measurements by the mobile device, in which case the first plurality of different times may comprise times that are determined by the conditions. The measurement trigger parameters may comprise at least one of a measurement periodicity parameter, a measurement movement parameter, a measurement floor change parameter, a measurement change of Serving Cell or AP parameter, and a logical measurement combination parameter.

The reporting trigger parameters may comprise conditions for sending measurements to the server at 1330, in which case the second plurality of different times comprise times that are determined by the conditions. The reporting trigger parameters may comprise at least one of a real time parameter, a quasi-real time parameter and a batch parameter. In some embodiments, the real time parameter is included in the reporting trigger parameters but not the quasi-real time parameter or the batch parameter. In these embodiments, the second plurality of different times may be equivalent to (e.g. may be the same as or approximately the same as) either the first plurality of different times or a subset of the first plurality of different times. This equivalence or near equivalence of the first and second pluralities of different times may arise due to the mobile device reporting crowdsourcing measurements (or discarding crowdsourcing measurements if they cannot be sent) as soon as they are obtained due to the real time parameter, in which case measurement and reporting times will be the same or approximately the same.

In some other embodiments, the quasi-real time parameter may be included in the reporting trigger parameters but not the real time parameter or the batch parameter. In these embodiments, a subset of the second plurality of different times may be equivalent to (e.g. may be the same as or approximately the same as) a subset of the first plurality of different times. This subset relationship may arise due to the mobile device reporting a subset of crowdsourcing measurements as soon as they are obtained (in which case measurement and reporting times will be the same or approximately the same) and reporting other crowdsourcing measurements sometime after they are obtained (in which case measurement and reporting times will generally be different) due to the quasi-real time parameter.

In some further embodiments, the batch parameter may be included in the reporting trigger parameters but not the real time parameter or the quasi-real time parameter. In these embodiments, the measurements obtained by the mobile device at each of the first plurality of different times may be stored by the mobile device. In addition in these embodiments, the measurements sent by the mobile device may comprise the measurements that are currently stored by the mobile device at each of the second plurality of different times, and each of the second plurality of different times may be based on the batch parameter. For example, each of the second plurality of different times may be triggered by one or more trigger conditions associated with the batch parameter.

In some embodiments, the batch parameter may comprise at least one of a batch report periodicity parameter, a batch report movement parameter, a batch report on change of serving network parameter, a batch access network restriction parameter and a batch storage overflow parameter.

In some embodiments, the duration trigger parameters may comprise at least one of a crowdsourcing start time parameter and a crowdsourcing duration parameter.

The request at 1310, the response at 1320 and each measurement report at 1330 may comprise a session ID. The session ID in the response and in each measurement report may comprise a fixed anonymous value (e.g. a value of zero).

The procedure 1300 may further comprise sending a crowdsourcing query to the mobile device and receiving a response from the mobile device, wherein the response comprises the second control parameters and the second measurement parameters. In some embodiments, the crowdsourcing query may correspond to step 7 in FIG. 2 and the response to the query may correspond to step 8 in FIG. 2.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g. procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

For example, non-transient computer-readable storage medium, for a mobile device to report crowdsourcing measurements to a first server, including program code stored thereon, comprising program code to: receive a request from a second server, wherein the request comprises first control parameters and first measurement parameters; return a response to the second server, wherein the response comprises second control parameters and second measurement parameters; obtain measurements at a first plurality of different times, wherein the measurements are based on the second measurement parameters, and wherein the first plurality of different times is based on the second control parameters; and send the measurements to the first server in a plurality of measurement reports at a second plurality of different times, wherein the second plurality of different times is based on the second control parameters.

A non-transient computer-readable storage medium, for a server to report crowdsourcing measurements from a mobile device, including program code stored thereon, comprising program code to: send a request to the mobile device, wherein the request comprises first control parameters and first measurement parameters; receive a response from the mobile device, wherein the response comprises second control parameters and second measurement parameters; and receive measurements from the mobile device in a plurality of measurement reports, wherein the measurements are obtained by the mobile device at a first plurality of different times based on the second control parameters, and wherein the measurements are sent by the mobile device at a second plurality of different times determined by the second control parameters.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. For example, an apparatus, method and system may contain of any of the preceding examples described herein.

What is claimed is:

1. A method in a mobile device for reporting crowdsourcing measurements to a first server, comprising:
    receiving a request from a second server, wherein the request comprises first control parameters and first measurement parameters;
    returning a response to the second server, wherein the response comprises second control parameters and second measurement parameters;
    obtaining measurements at a first plurality of different times, wherein the measurements are based on the second measurement parameters, and wherein the first plurality of different times is based on the second control parameters; and
    sending the measurements to the first server in a plurality of measurement reports at a second plurality of different times, wherein the second plurality of different times is based on the second control parameters.

2. The method of claim 1, wherein the first server is a data server and the second server is a control server.

3. The method of claim 1, wherein the second control parameters are equivalent to the first control parameters.

4. The method of claim 1, wherein the second measurement parameters are equivalent to or a subset of the first measurement parameters.

5. The method of claim 1, wherein the first control parameters and the second control parameters each comprise at least one of activation trigger parameters, measurement trigger parameters, reporting trigger parameters and duration trigger parameters.

6. The method of claim 5, wherein the activation trigger parameters comprise conditions for activating and deactivating crowdsourcing at the mobile device, and wherein the first plurality of different times comprises times when crowdsourcing is activated.

7. The method of claim 6, wherein the activation trigger parameters comprise at least one of a geographic area parameter, an activation area parameter, a deactivation area parameter, a country-network parameter, a detected transmitters parameter, a target motion state parameter, an environment parameter, a logical trigger combination parameter, an activation delay parameter and a deactivation delay parameter.

8. The method of claim 5, wherein the measurement trigger parameters comprise conditions for obtaining the measurements, and wherein the first plurality of different times comprises times that are determined by the conditions.

9. The method of claim 8, wherein the measurement trigger parameters comprise at least one of a measurement periodicity parameter, a measurement movement parameter, a measurement floor change parameter, a measurement change of Serving Cell or AP parameter, and a logical measurement combination parameter.

10. The method of claim 5, wherein the reporting trigger parameters comprise conditions for sending the measurements to the first server, and wherein the second plurality of different times comprises times that are determined by the conditions.

11. The method of claim 10, wherein the reporting trigger parameters comprise at least one of a real time parameter, a quasi-real time parameter and a batch parameter.

12. The method of claim 11, wherein the real time parameter is included in the reporting trigger parameters but not the quasi-real time parameter or the batch parameter, and wherein the second plurality of different times are equivalent to the first plurality of different times or a subset of the first plurality of different times.

13. The method of claim 11, wherein the quasi-real time parameter is included in the reporting trigger parameters but not the real time parameter or the batch parameter, and wherein a subset of the second plurality of different times is equivalent to a subset of the first plurality of different times.

14. The method of claim 11, wherein the batch parameter is included in the reporting trigger parameters but not the real time parameter or the quasi-real time parameter, and further comprising:
    storing the measurements obtained at each of the first plurality of different times; and sending all measurements to the first server that are currently stored at each of the second plurality of different times, wherein each of the second plurality of different times is based on the batch parameter.

15. The method of claim 14, wherein the batch parameter comprises at least one of a batch report movement parameter, a batch report on change of serving network parameter, a batch access network restriction parameter and a batch storage overflow parameter.

16. The method of claim 5, wherein the duration trigger parameters comprise at least one of a crowdsourcing start time parameter and a crowdsourcing duration parameter.

17. The method of claim 1, wherein the request, the response and each measurement report comprise a session ID.

18. The method of claim 17, wherein the session ID in the response and in each measurement report comprises a fixed anonymous value.

19. The method of claim 1, further comprising:
receiving a crowdsourcing query from one of the first server and the second server; and
returning a response to the crowdsourcing query to the one of the first server and the second server, wherein the response to the crowdsourcing query comprises the second control parameters and the second measurement parameters.

20. A method in a server for obtaining crowdsourcing measurements from a mobile device, comprising:
sending a request to the mobile device, wherein the request comprises first control parameters and first measurement parameters;
receiving a response from the mobile device, wherein the response comprises second control parameters and second measurement parameters; and
receiving measurements from the mobile device in a plurality of measurement reports, wherein the measurements are obtained by the mobile device at a first plurality of different times based on the second control parameters, and wherein the measurements are sent by the mobile device at a second plurality of different times determined by the second control parameters.

21. The method of claim 20, wherein the second control parameters are equivalent to the first control parameters.

22. The method of claim 20, wherein the second measurement parameters are equivalent to the first measurement parameters or a subset of the first measurement parameters.

23. The method of claim 20, wherein the first control parameters and the second control parameters each comprise at least one of activation trigger parameters, measurement trigger parameters, reporting trigger parameters and duration trigger parameters.

24. The method of claim 23, wherein the activation trigger parameters comprise conditions for activating and deactivating crowdsourcing at the mobile device, and wherein the first plurality of different times comprises times when crowdsourcing is activated.

25. The method of claim 24, wherein the activation trigger parameters comprise at least one of a geographic area parameter, an activation area parameter, a deactivation area parameter, a country-network parameter, a detected transmitters parameter, a target motion state parameter, an environment parameter, a logical trigger combination parameter, an activation delay parameter and a deactivation delay parameter.

26. The method of claim 23, wherein the measurement trigger parameters comprise conditions for obtaining the measurements, and wherein the first plurality of different times comprises times that are determined by the conditions.

27. The method of claim 26, wherein the measurement trigger parameters comprise at least one of a measurement periodicity parameter, a measurement movement parameter, a measurement floor change parameter, a measurement change of Serving Cell or AP parameter, and a logical measurement combination parameter.

28. The method of claim 23, wherein the reporting trigger parameters comprise conditions for sending the measurements to the server, and wherein the second plurality of different times comprises times that are determined by the conditions.

29. The method of claim 28, wherein the reporting trigger parameters comprise at least one of a real time parameter, a quasi-real time parameter and a batch parameter.

30. The method of claim 29, wherein the real time parameter is included in the reporting trigger parameters but not the quasi-real time parameter or the batch parameter, and wherein the second plurality of different times are equivalent to the first plurality of different times or a subset of the first plurality of different times.

31. The method of claim 29, wherein the quasi-real time parameter is included in the reporting trigger parameters but not the real time parameter or the batch parameter, and wherein a subset of the second plurality of different times is equivalent to a subset of the first plurality of different times.

32. The method of claim 29, wherein the batch parameter is included in the reporting trigger parameters but not the real time parameter or the quasi-real time parameter, wherein the measurements obtained by the mobile device at each of the first plurality of different times are stored by the mobile device, wherein the measurements sent by the mobile device comprise the measurements that are currently stored by the mobile device at each of the second plurality of different times, and wherein each of the second plurality of different times is based on the batch parameter.

33. The method of claim 32, wherein the batch parameter comprises at least one of a batch report periodicity parameter, a batch report movement parameter, a batch report on change of serving network parameter, a batch access network restriction parameter and a batch storage overflow parameter.

34. The method of claim 23, wherein the duration trigger parameters comprise at least one of a crowdsourcing start time parameter and a crowdsourcing duration parameter.

35. The method of claim 20, wherein the request, the response and each measurement report comprise a session ID.

36. The method of claim 35, wherein the session ID in the response and in each measurement report comprise a fixed anonymous value.

37. The method of claim 20, further comprising:
sending a crowdsourcing query to the mobile device; and
receiving a response to the crowdsourcing query from the mobile device, wherein the response to the crowdsourcing query comprises the second control parameters and the second measurement parameters.

38. A mobile device for reporting crowdsourcing measurements to a first server, comprising:
a receiver to receive a request from a second server, wherein the request comprises first control parameters and first measurement parameters;
a transmitter to return a response to the second server, wherein the response comprises second control parameters and second measurement parameters;

a processor to obtain measurements at a first plurality of different times, wherein the measurements are based on the second measurement parameters, and wherein the first plurality of different times is based on the second control parameters; and wherein the transmitter further sends the measurements to the first server in a plurality of measurement reports at a second plurality of different times, wherein the second plurality of different times is based on the second control parameters.

39. The mobile device of claim 38, wherein the first server is a data server and the second server is a control server.

40. The mobile device of claim 38, wherein the first control parameters and the second control parameters each comprise at least one of activation trigger parameters, measurement trigger parameters, reporting trigger parameters and duration trigger parameters.

41. The mobile device of claim 38, wherein the plurality of measurement reports comprises a fixed anonymous value.

42. A server for obtaining crowdsourcing measurements from a mobile device, comprising:
    a transmitter to send a request to the mobile device, wherein the request comprises first control parameters and first measurement parameters; and
    a receiver:
    to receive a response from the mobile device, wherein the response comprises second control parameters and second measurement parameters; and
    to receive measurements from the mobile device in a plurality of measurement reports, wherein the measurements are obtained by the mobile device at a first plurality of different times based on the second control parameters, and wherein the measurements are sent by the mobile device at a second plurality of different times determined by the second control parameters.

43. The server of claim 42, wherein the second control parameters are equivalent to the first control parameters.

44. The server of claim 42, wherein the first control parameters and the second control parameters each comprise at least one of activation trigger parameters, measurement trigger parameters, reporting trigger parameters and duration trigger parameters.

45. The server of claim 42, wherein the plurality of measurement reports comprise a fixed anonymous value.

46. A mobile device for reporting crowdsourcing measurements to a first server, comprising:
    means for receiving a request from a second server, wherein the request comprises first control parameters and first measurement parameters;
    means for returning a response to the second server, wherein the response comprises second control parameters and second measurement parameters;
    means for obtaining measurements at a first plurality of different times, wherein the measurements are based on the second measurement parameters, and wherein the first plurality of different times is based on the second control parameters; and
    means for sending the measurements to the first server in a plurality of measurement reports at a second plurality of different times, wherein the second plurality of different times is based on the second control parameters.

47. The mobile device of claim 46, wherein the first server is a data server and the second server is a control server.

48. The mobile device of claim 46, wherein the first control parameters and the second control parameters each comprise at least one of activation trigger parameters, measurement trigger parameters, reporting trigger parameters and duration trigger parameters.

49. The mobile device of claim 46, wherein the plurality of measurement reports comprises a fixed anonymous value.

50. A server for obtaining crowdsourcing measurements from a mobile device, comprising:
    means for sending a request to the mobile device, wherein the request comprises first control parameters and first measurement parameters;
    means for receiving a response from the mobile device, wherein the response comprises second control parameters and second measurement parameters; and
    means for receiving measurements from the mobile device in a plurality of measurement reports, wherein the measurements are obtained by the mobile device at a first plurality of different times based on the second control parameters, and wherein the measurements are sent by the mobile device at a second plurality of different times determined by the second control parameters.

51. The server of claim 50, wherein the second control parameters are equivalent to the first control parameters.

52. The server of claim 50, wherein the first control parameters and the second control parameters each comprise at least one of activation trigger parameters, measurement trigger parameters, reporting trigger parameters and duration trigger parameters.

53. The server of claim 50, wherein the plurality of measurement reports comprise a fixed anonymous value.

54. A non-transient computer-readable storage medium, for a mobile device to report crowdsourcing measurements to a first server, including program code stored thereon, comprising program code to:
    receive a request from a second server, wherein the request comprises first control parameters and first measurement parameters;
    return a response to the second server, wherein the response comprises second control parameters and second measurement parameters;
    obtain measurements at a first plurality of different times, wherein the measurements are based on the second measurement parameters, and wherein the first plurality of different times is based on the second control parameters; and
    send the measurements to the first server in a plurality of measurement reports at a second plurality of different times, wherein the second plurality of different times is based on the second control parameters.

55. The non-transient computer-readable storage medium of claim 54, wherein the first server is a data server and the second server is a control server.

56. The non-transient computer-readable storage medium of claim 54, wherein the first control parameters and the second control parameters each comprise at least one of activation trigger parameters, measurement trigger parameters, reporting trigger parameters and duration trigger parameters.

57. The non-transient computer-readable storage medium of claim 54, wherein the plurality of measurement reports comprises a fixed anonymous value.

58. A non-transient computer-readable storage medium, for a server to report crowdsourcing measurements from a mobile device, including program code stored thereon, comprising program code to:
    send a request to the mobile device, wherein the request comprises first control parameters and first measurement parameters;

receive a response from the mobile device, wherein the response comprises second control parameters and second measurement parameters; and receive measurements from the mobile device in a plurality of measurement reports, wherein the measurements are obtained by the mobile device at a first plurality of different times based on the second control parameters, and wherein the measurements are sent by the mobile device at a second plurality of different times determined by the second control parameters.

59. The non-transient computer-readable storage medium of claim 58, wherein the second control parameters are equivalent to the first control parameters.

60. The non-transient computer-readable storage medium of claim 58, wherein the first control parameters and the second control parameters each comprise at least one of activation trigger parameters, measurement trigger parameters, reporting trigger parameters and duration trigger parameters.

61. The non-transient computer-readable storage medium of claim 58, wherein the plurality of measurement reports comprise a fixed anonymous value.

* * * * *